US 6,691,094 B1

(12) United States Patent
Herschkorn

(10) Patent No.: US 6,691,094 B1
(45) Date of Patent: Feb. 10, 2004

(54) BANK LOAN TRADING SYSTEM AND METHOD

(76) Inventor: Lee N. Herschkorn, 111 E. 85th St., Apt. 18 E, New York, NY (US) 10028

( * ) Notice: Subject to any disclaimer, the term of this patent is extended or adjusted under 35 U.S.C. 154(b) by 0 days.

(21) Appl. No.: 09/406,885

(22) Filed: Sep. 28, 1999

(51) Int. Cl.[7] .................................................. G06F 17/60
(52) U.S. Cl. ................................................ 705/37; 705/26
(58) Field of Search .............................. 705/26, 27, 35, 705/37

(56) References Cited

U.S. PATENT DOCUMENTS

| | | | | | |
|---|---|---|---|---|---|
| 4,903,201 | A | * | 2/1990 | Wagner ....................... | 705/37 |
| 5,077,665 | A | * | 12/1991 | Silverman et al. ............ | 705/37 |
| 5,101,353 | A | * | 3/1992 | Lupien et al. ................. | 705/37 |
| 5,915,209 | A | * | 6/1999 | Lawrence .................... | 340/3.7 |
| 6,157,918 | A | * | 12/2000 | Shepherd ..................... | 705/37 |
| 6,233,566 | B1 | * | 5/2001 | Levine et al. ................. | 705/37 |
| 6,304,858 | B1 | * | 10/2001 | Mosler et al. ................ | 705/37 |
| 6,311,178 | B1 | * | 10/2001 | Bi et al. ....................... | 705/37 |
| 6,321,212 | B1 | * | 11/2001 | Lange .......................... | 705/37 |

FOREIGN PATENT DOCUMENTS

JP       2002-56235 A  *  2/2002   ............ G06F/17/60

OTHER PUBLICATIONS

Burkart, Mike, "Initial Shareholdings and overbidding in takeover contests", Dec. 1995, Journal of Finance, vol. 50, No. 5, pp. 1491–1515.*
"A Revolution in Securities Markets'Structures?" Nov. 1996, Financial Market Trends (France), No. 65, pp. 15–37.
Schwartz et al, "Next–Generation Securities Market Systems," Fall 1997, Journal of Management Information Systems, vol. 14, No. 2, pp. 57–79.

* cited by examiner

Primary Examiner—Michael Cuff
Assistant Examiner—Bryan Jaketic

(57) ABSTRACT

A bank loan trading system and method is provided to utilize an electronic facility to facilitate the trading of bank loans. Sellers and buyers enter offers and bids that are posted to all potential buyers and sellers, unless the orders are undisclosed. It is determined whether there is a match between one of the bids and one of the offers of the same loan. If an order can be filled, the system and method provide various confirmation techniques to ensure that a resultant trade does not violate the terms of the bank loan itself. If an order can be filled partially and the remaining portion of the order may be filled in part or in full, the party entering the initial partial order is given the choice of entering into the second trade. Buyers and sellers also can enter linked orders representing two different orders for the same loan and upon filling one of the linked orders, the other order is canceled.

14 Claims, 19 Drawing Sheets

Bid and Offer Page

| Field | Value |
|---|---|
| User Name | Investor's Name |
| User Password | Investor's Password |
| Bid or Offer: | Bid / Bid / Offer |
| Disclosure on System: | Disclosed / Disclosed / Undisclosed |
| Borrower | Allied Waste / Allied Waste / American Axle / American Commercial Lines / American Tower Systems / American Wireless / Amphenol / Ball Corp / Bresnan / Bridge Information / Capstar Broadcasting / Other - Input Exact Name |
| Tranche | Pro Rata (PR) / Pro Rata (PR) / Revolver (RC) / Term Loan (TL A) / Term Loan B (TL B) / Term Loan C (TL C) / Term Loan B & C (TL B/C) / Other - Input Tranche |

*(3 Items below appear only for offers)*

| Field | Value |
|---|---|
| Minimum Assignment (If not already in system, enter amount & fax relevant page from Credit Agreement) | Enter Amount / Enter Amount / $00,000,000 (already in system) |
| Base Rate (Fax latest funding report to (212) 555-1234) | LIBOR / Prime / Certificate of Deposit / Fed Funds |
| Base Rate Spread (Fax latest funding report) | 300.0 bp |

*(Item below appears only for revolver or pro rata offers)*

| Field | Value |
|---|---|
| Unutilized Commitment Fee (default is NA) | 50.0 bp / 50.0 bp / NA |
| Link Order (Default No) | No / Yes / No |

A Link Offer will generate an identical order except for size and order fill instruction. Once one of two linked orders is filled, the other is automatically cancelled. Both orders cannot be filled

*(Appears only for Yes to Link Order that is an offer)*
Link Offer Amount: $00,000,000.00
(Enter to the nearest cent)

*(Appears only for Yes to Link Order that is a bid)*
Link Bid Amount: $00 million
(Enter in million dollar increments)

| Field | Value |
|---|---|
| Current Trade Confirm Form | Fax: (212) 555-1234 |
| Change Trade Confirm Form (No Change is the Default) | No Change / Fax / Pager / No Change |
| Change Trade Confirm Tel. No. | (212) 555-5678 |
| Bid or Offer Price (Par = 100) (5 bp increments) | 100.00 |
| Amount (Sellers enter to the nearest cent) | $00,000,000.00 |

*(Sellers see above Amount input, Buyers below)*

| Field | Value |
|---|---|
| Amount | $00 Million |

*(Buyers enter to the nearest million dollars)*

| Field | Value |
|---|---|
| Fill Instructions: (Default: All or None) | Any partial fill ≥ Minimum Size (Partial ≥ Min.) / Any partial fill ≥ Minimum Size (Partial ≥ Min.) / Only $5 MM increments ≥ Min. Size (Partial 5 Only) / All or None |

*(Does Not Appear for All or None or Order Size ≤ $5 Million Amount)*

| Field | Value |
|---|---|
| Minimum Size: | $00 Million |

*(Enter in million dollar increments. Must be $5 MM multiple for Partial 5 Only)*

| Field | Value |
|---|---|
| Expiration | Good until Cancel / Good until Cancel / Good until 5 pm EST Today / Expiration Date & Time (input below) |

*(5 items below appear only for Expiration Date & Time (input below))*

| Field | Value |
|---|---|
| Expiration Month | April / January / February |
| Expiration Date | 01 / 01 / 02 |
| Expiration Year | 1999 / 1999 / 2000 |
| Expiration Hour (Default 5:00 pm EST) | 5 pm EST / 12 pm EST / 1 pm EST |
| Expiration Minute | 01 / 01 / 02 |

*(Appears only for Yes to Link Order)*

| Field | Value |
|---|---|
| Link Order Fill Instructions: (Default: All or None) | Any partial fill ≥ Minimum Size (Partial ≥ Min.) / Any partial fill ≥ Minimum Size (Partial ≥ Min.) / Only $5 MM increments ≥ Min. Size (Partial 5 Only) / All or None |

*(Appears only for Yes to Link Order with new Partial ≥ Min. or Partial 5 Only order)*

| Field | Value |
|---|---|
| Minimum Size: | $00 Million |

*(Enter in million dollar increments. Must be $5 MM multiple for Partial 5 Only)*

Fig. 5

Bid and Offer Confirm Page

Username Firm has made the following order:

Bid 99.50 for $12,000,000 of American Wireless TL B
with a Partial 5 Only order fill instruction and
Minimum Size of $5,000,000
Expiration is May 21, 5:00 PM EST Your bid may be filled in odd amounts which when rounded to
the nearest million dollars may equal:
$5 million, $10 million or $12 million
{see next page for examples of possible statements and fill amounts}

If this is correct, please confirm by entering your password below

| Investor's Password |

{When the user enters an Offer, the following representation and fax direction will appear and be required}
By entering this Offer, you represent that your sale is in compliance with
the relevant credit documents such that (1) you have offered the minimum
assignment amount and (2) any remaining holding you may have, after any
partial or total fill as designated in your order, will meet the required
minimum hold. Please type the word "yes" in the box below to make such
binding representation.

|                    | {User must enter "yes" (any variation of caps) otherwise error message occurs}

Please fax the latest funding report available to (212)555-1234
to increase the likelihood of executing your offer.

{If an Offer is made and NO Minimum Assignment is in the system, print the following}
You have stated a minimum assignment amount of $5,000,000
Please fax the minimum assignment language from the
credit agreement to (212) 555-1234.

Please note that if you change your order fill instruction to Partial > Min.,     Your current trade confirm form and
you will increase the chance of filling at least part of your order              contact number is Pager: (212) 555-5678

| Return to Bid and Offer Input Page |        | Submit Order |

Fig. 7

Auction Post Page

| | |
|---|---|
| User Name | Investor's Name |
| User Password | Investor's Password |
| Current Trade Confirm Form | Fax: (212) 555-1234 |
| Auction or Reverse Auction | Auction |
| | Auction |
| | Reverse Auction |
| Auction Type | Standard Auction |
| | Standard Auction |
| | Blind Auction (only for all or none) |
| | Dutch Auction (only for partial bids allowed) |
| Borrower | Allied Waste |
| | Allied Waste |
| | American Axle |
| | American Commercial Lines |
| | American Tower Systems |
| | American Wireless |
| Tranche | Pro Rata (PR) |
| | Pro Rata (PR) |
| | Revolver (RC) |
| | Term Loan (incl. Term Loan A - TL) |
| | Term Loan B (TL B) |
| | Term Loan C (TL C) |
| | Term Loan B & C (TL B / C) |
| | Other - Input Tranche |
| Amount | $00,000,000.00 |

{Sellers see above Amount input, Buyers (reverse auction) below}

| | |
|---|---|
| Amount | $00 Million |

(Reverse Auction Buyers enter to the nearest million dollars)

| | |
|---|---|
| Min. Acceptable Offer | 100.00 |

(Par = 100, 5 bp increments) (Change to Maximum Acceptable Bid for Reverse)

{2 items below shown only for auctions, not reverse auctions}

| | |
|---|---|
| Base Rate | LIBOR |
| (Fax latest funding report | Prime |
| to (212) 555-1234) | Certificate of Deposit |
| | Fed Funds |
| Base Rate Spread | 300.0 bp |

(Fax latest funding report)

{Item below appears only for revolver or pro rata auctions, not reverse}

| | |
|---|---|
| Unutilized Commitment Fee | 50.0 bp |

| | |
|---|---|
| Change Trade Confirm Form | Pager |
| {No Change is the Default} | Fax |
| | Pager |
| | No Change |
| Change Trade Confirm Tel. No. | (212) 555-5678 |
| Standard Auction Month | April |
| | January |
| | February |
| Standard Auction Date | 01 |
| | 01 |
| | 02 |
| Standard Auction Begin Hour | 1 pm EST |
| (Default 1:00 pm EST) | 12 noon EST |
| | 1 pm EST |
| Standard Auction Begin Minute | 00 |
| (Default 1:00 pm EST) | 01 |
| | 02 |
| Blind/Dutch Auction Month | April |
| | January |
| | February |
| Blind/Dutch Auction Date | 01 |
| | 01 |
| | 02 |
| Blind/Dutch Auction Year | 1999 |
| | 1999 |
| | 2000 |
| Completion Hour | 5 pm EST |
| (Default 5:00 pm EST) | 12 noon EST |
| | 1 pm EST |
| Completion Minute | 00 |
| (Default 5:00 pm EST) | 01 |

{Item below appears only for dutch auctions}

| | |
|---|---|
| Minimum Partial Amounts | $5 million |
| (in million dollar increments, | $1 million |
| subject to minimum assignment) | $5 million |
| | $10 million |
| | All or None |

{Item below appears only for dutch auctions, but not reverse dutch}

| | |
|---|---|
| Minimum Assignment | Enter Amount |
| (If not already in system, | Enter Amount |
| enter amount & fax relevant | $00,000,000 (already in system) |

Fig. 8

Auction Bid / Reverse Offer Input Page

Auctions Scheduled

| Borrower | Tranche | Sale or Reverse | Amount | Minimum Bid / Maximum Offer | Auction Type | Date | Standard Auction Begin Time | Blind or Dutch Auction End Time |
|---|---|---|---|---|---|---|---|---|
| American Axle | PR | Sale | $10.0 | Min Bid 97.00 | Standard | Mon. May 17 | 1:00 PM | |
| American Tower Systems | TL B | Sale | $10.0 | Min Bid 97.00 | Standard | Mon. May 17 | 2:00 PM | |
| American Wireless | TL B | Reverse | $5.0 | Max Offer 101.00 | Blind | Mon. May 17 | | 5:00 PM |
| Ball Corp | RC | Sale | $20.0 | Min Bid 94.50 | Dutch | Tues. May 18 | | 4:00 PM |

Current Standard Auction (Bidding in Progress)

| Borrower | Tranche | Amount | Highest Bid | Time until Gavel Falls |
|---|---|---|---|---|
| American Axle | PR | $10.0 | 98.20 | 3:30 min:sec |

[Click Here to Refresh Screen]

as of 1:32:21 p.m. EST

User Name: Investor's Name

User Password: Investor's Password

Note: Once an auction bid (or offer in the case of a reverse auction) has been submitted, it can NOT be rescinded. Only the failure of the bids and offers to meet the user's minimum bid or maximum offer will prevent completion of the auction.

Borrower, Tranche & Amount

| American Tower Systems | TL B | $10.0 |
|---|---|---|
| American Axle | PR | $10.0 |
| American Tower Systems | TL B | $10.0 |
| American Wireless | TL B | $5.0 |
| Ball Corp | RC | $20.0 |

Bid / Reverse Offer: 100.00
(Par = 100, 5 bp increments)

Dutch Auctions Only
Minimum Partial Amounts per Auction Sponsor's Instruction: $5 million Amount (subject to minimum partial amounts above): $00 million / Entire Auction Amount $00 million Username Trade Confirm Form    Fax: (212) 555-1234

Change Trade Confirm Form
(Applies to all orders)
{No Change is the Default}

Pager
Fax
Pager
No Change

Change Trade Confirm Tel. No.    (212) 555-5678
(Applies to all orders)

User Password    Investor's Password

Fig. 9

Auction Post Confirm Page

Username Firm has posted the following auction:

Standard Auction Sale {or Reverse-Offer} of $10,123,456.78 of
American Axle Pro Rata with a
Minimum Acceptable Bid {or Maximum Acceptable Offer} of 97.00
will begin at 1:00 p.m. on Monday, May 17.

If this is correct, please confirm by entering your password below

| Investor's Password |

{When the user enters an Auction Sale, the following representation and fax direction will appear and be required}

By entering this Auction Sale, you represent that your sale is in compliance with the relevant credit documents such that (1) you have offered the minimum assignment amount and (2) any remaining holding you may have after completion of the sale will meet the required minimum hold. Please type the word "yes" in the box below to make such binding representation.

|                    | {User must enter "yes" (any variation of caps) otherwise error message occurs}

Please fax the latest funding report available to (212) 555-1234 to execute your auction.

{If there is a dutch auction and NO Minimum Assignment is in the system, print the following}
You have stated a minimum assignment amount of $5,000,000

Please fax the minimum assignment language from the credit agreement to (212) 555-1234.

Your current trade notification form and contact number is:   Pager: (212) 555-5678

| Return to Auction Post Page |                    | Submit Order |

BANK LOAN TRADING SYSTEM AND METHOD

BACKGROUND OF THE INVENTION

The present invention relates to a loan trading system and corresponding method and, more particularly, to a loan trading system carried out over the Internet to match buyers and sellers of loans via the matching of bids and offers or through the conducting of auctions.

Bank Loan Facilities

Large corporations and trusts arrange bank loans in facilities provided by a group of banks and financial institutions, otherwise known as a syndicate. Bank loans typically consist of term loans and revolving credit facilities (also known as revolvers). Term loans are lent to the borrower and have a stated maturity date for repayment. In addition, term loans may be structured with an amortization schedule providing different maturity dates for partial amounts of the term loan with the final payment due on the final maturity date. Term loans may be prepaid but not re-borrowed under the same facility.

There may be more than one type or tranche of term loan under the same facility. These term loans are typically differentiated by the maturity date of the tranche. For example, the term loan with the shortest maturity date, typically referred to as the Term Loan A, may require a single amortization or have an amortization schedule with the last payment due on the final maturity date. A longer dated term loan or series of term loans under the same facility may have a maturity date longer than the Term Loan A. For example, a bank loan facility may have a Term Loan A tranche, a Term Loan B tranche with a final maturity date longer than the Term Loan A tranche, and a Term Loan C tranche, with a final maturity date longer than both the Term Loan A and Term Loan B tranches.

A revolver provides a commitment from the syndicate for the borrower to draw upon a set amount of money until the maturity date. The commitment is then composed of two portions, the drawn amount and the undrawn amount. The borrower may draw upon the revolver, increasing the drawn amount and reducing the undrawn amount. Part or all of the drawn amount may also be repaid, thereby increasing the availability under the commitment. Draws and repayments may take place continuously until the maturity date when all outstanding amounts are due. There is no requirement that any draw be followed sequentially by a repayment.

In some revolving credit facilities, draws may be predicated upon the satisfaction of certain requirements that limit the availability of money to an amount less than the total revolver commitment. These requirements, generally in the form of financial calculations, will generate a maximum available amount that the borrower can draw upon. This restricted amount of funds is typically referred to as the borrowing base.

Typically, bank loans have floating interest rates. Borrowed amounts are drawn for intervals which have base interest rates set by industry or bank standards plus an interest rate spread charged to the borrower. For example, funds may be drawn for a number of days, weeks or months. The most common form of base interest rate is the London Interbank Offered Rate or LIBOR. For example, a borrower would inform the bank group of its desire to borrow funds under 1 month LIBOR. The interest rate would then be set for the 1 month interval at the then current 1 month LIBOR interest rate plus the interest rate spread that is set under the facility. At the end of the 1 month period, the money may be repaid or reborrowed for another period, whether or not the period would be the same or different length. In this way, the interest rate is said to float as it is resets periodically.

There are generally two types of lenders in bank loan facilities. Banks typically provide loans under the revolver and term loan A tranches. Institutional investors such as mutual funds, privately-raised funds, investment companies or insurance companies typically provide loans under the term loans with longer maturity dates than the term loan A tranche. These term loans, such as the term loan B and the term loan C in the previous example, are typically referred to as institutional term loans. The combination of the term loan A and revolver tranches are typically referred to as the pro rata tranches.

To date, the institutional term loans typically have a higher interest rate spread than the pro rata tranches. Other than the differences in the maturity dates and amortization schedules, the lenders under the different tranches typically have the same legal rights under the bank loan facility.

Bank Loan Trading

An active market has developed for the trading of bank loans. As a private instrument, the trading of bank loans is not subject to the laws pertaining to the trading of public securities. Bank loan trades are conducted by the assignment of the bank loan from one lender to another. Bank loan trades may be arranged through the negotiation of individual parties, with the assistance of brokers, or through an auction. There is no regulation on how these trades are conducted, but assignments typically require the approval of the administrative agent and the borrower. An administrative agent provides the processing of paperwork and movement of funds associated with a bank loan on behalf of the syndicate and the borrower. The approvals typically require that they not be unreasonably withheld.

There are generally two restrictions on the assignment of bank loans, compliance with a minimum assignment amount and a minimum retained amount. The minimum assignment amount sets a floor for the amount to be traded and the minimum retained amount pertains to the amount the assignor or seller of the bank loan will continue to hold after assignment of a partial amount of their commitment. The seller may assign its total commitment, but it may not retain a commitment below the minimum retained amount.

The participants in the bank loan market include the aforementioned banks and institutions, as well as dealers who make markets in or act as brokers for bank loans. Therefore, there are two types of trades in bank loans: principal and brokered. Principal trades pertain to transactions where a dealer will buy the loan with its own capital and hold the position in inventory until resale. Brokered trades are those that the dealer has arranged for both the purchase of the bank loan from a seller and sale of the bank loan to a buyer. Therefore, the dealer does not risk its own capital on the two transactions.

Each trade or assignment generally requires the payment of an assignment fee to the administrative agent of a bank loan facility. Typically, the parties split these fees. In the case of a brokered trade, the dealer will typically pay half the fee for the purchase from the seller and half the fee for the sale to the buyer. Note that a dealer is not required to conduct a trade in such a manner to avoid the buyer and seller learning each others' identity. Therefore, a buyer and seller may conduct a single trade to effect the assignment and split the fee amongst themselves.

How the Market Functions

The loan trading market is considered an over-the-counter market. This means that there is no exchange through which bids and offers are quoted and matched bids and offers are processed. For purposes of this discussion, trading is broken down into two types: trades through interdealer brokers and all other trades.

Interdealer brokers match trades between dealers only. The interdealer brokers will market bids and offers, also known as offerings, to the dealers without disclosing the name of the potential buyers and sellers until a bid and offer is matched. The interdealer brokers will market the offerings to dealers either through telephone contact or through the posting of offerings on terminals connected via a direct telephone line to the interdealer broker's computer system. The interdealer broker systems do not use the Internet for transmission.

These interdealer broker systems provide limited information that includes only the name of the borrower, the tranche offered or bid, the amount of the bids and offers and the price at which the bids and offers are quoted. To complete a trade, a dealer must contact the interdealer broker by telephone. Trades cannot be completed on the system itself.

All other trades consist of those between any of the dealers, bank or institutions. These trades are all conducted by the telephone.

Current Electronic Trading Systems

The most common form of on-line trading is stock or equity trading. This trading pertains only to publicly-traded securities which are securities that are registered with the U.S. Securities and Exchange Commission. At least a dozen firms have on-line trading websites.

All of these websites essentially perform the same function as each other. Clients are able to enter orders into the system connected through the Internet for the purchase or sale of stock that may subsequently be executed through a stock exchange or over the counter market makers. The parameters of the orders are limited to the particular issue of publicly-traded stock, the number of shares to be sold, whether the order requires execution to take place for the entire number of shares indicated (referred to as all or none) or execution is allowable for some part thereof, whether the order will remain open until the end of the day or until canceled (referred to as good for the day and good until canceled, respectively), and order types such as market order (the trade is executed at the currently available bids or offers), limit order (the trade will not occur unless the user receives a bid at or above his required price or an offer at or below his required price), stop order (the trade will occur at the then market price once the security has traded at the price chosen by the user, referred to as the stop price), and stop limit (a limit order that becomes effective once a trade occurs at the stop price). The only differentiation between website-based stock brokerage sites lies in the amount of information to which the users have access. For example, some websites may provide current news and financial statistics, others may include historical data and others may provide analyst research reports.

There currently are approximately thirty (30) electronic trading systems engaged in the on-line sale and/or trading of one, two or all of treasury, municipal and corporate bonds. These systems can be broken down into dealer systems that allow users to trade only with dealers, but not with each other, cross-matching systems that allow users to trade with each other anonymously, primary market bidding systems that allow users to bid directly on new issues, and a direct issuance system that allows investors to buy securities directly from the issuer. Limited information is available on most of these systems as access is limited to authorized users.

There are also financial information websites and direct wireline systems that provide databases of news and financial information to allow for the analysis of issuers of stocks, bonds and derivative securities and their underlying securities. Bloomberg provides one such news and financial information database system and provides to the user the ability to input current information to determine the yield of a bank loan (the rate of return including adjustments for purchase prices with a premium or discount to par measured in terms of two interest rate components, one being the floating rate of interest utilized as a base rate such as LIBOR and the other a numerical measure of the rate of interest). Bloomberg does not provide information on bank loan interest rate spreads after a transaction has closed, nor does it provide a comparative table of bank loan yields.

In addition to the above-mentioned limitations and shortcomings of currently available electronic trading systems, currently available financial websites are limited to the trading of financial assets such as even lots of stocks and bonds in the secondary market or the auction of financial assets in the primary market, in other words at the time of their initial issuance, such as the sale of treasury bonds or initial public offering of stock by on-line investment banks.

Auction websites of non-financial assets typically are conducted with a non-blind process and a preset end time. Therefore the then highest offer is revealed to users throughout the process and the website typically receives a large influx of bids just prior to the deadline since doing so generally increases the bidders' chances of success, whereas earlier bidders' efforts go unsuccessful.

Bank loan auctions are currently conducted manually by sponsors with the assistance of facsimile and telephone transmission. These manual auctions are limited in the number of participants that may be reached and the process of conducting such manual auctions may not proceed equitably. For example, blind auctions, where bids are not revealed, often do not close at or near their deadlines, indicating that the auction's sponsor is disclosing the highest bid to a favored third party in the hope of an even higher bid. In a further example, sponsors have pulled auctions when bids are too low, thereby wasting the efforts of participants who may do a significant amount of work prior to submitting a bid or offer.

OBJECTS OF THE INVENTION

It is therefore an object of this invention to provide a bank loan trading system that provides to prospective buyers and sellers information regarding bank loans not previously available to such parties.

Another object of the present invention is to provide an electronic matching of buyers and sellers for the trading of bank loans.

A further object of the present invention is to provide such electronic matching of buyers and sellers that avoids the shortcoming and limitations of electronic trading systems previously mentioned.

An additional object of the present invention is to conduct electronic auctions for bank loans in a fair and equitable manner.

These and other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for facilitating the trading of bank loans between buyers and sellers. Bank loan information (e.g., borrower and tranche) regarding bank loans for trading are posted to potential buyers and sellers, sellers and buyers enter offers and bids, respectively, for posted loans and the offers and bids are then posted to all potential buyers and sellers. It is determined whether a match between one of the bids and one of the offers for the same bank loan exists, and if a match exists, the matching bid and offer are filled by conducting a trade between the buyer who entered the bid and the seller who entered the offer.

As one aspect of the present invention, only unfilled bids and orders are posted.

As a further aspect of the present invention, the seller of a bank loan provides the information regarding a bank loan for sale not previously posted.

As an additional aspect of the present invention, when either a bid or an offer is entered by a buyer or seller, respectively, a dollar amount and price of the bid or offer for that bank loan are provided. The type of bid or offer also is provided and identifies the order as an All or None order, a Partial Fill order, or a Partial Increments Only order. The All or None order represents an order having a possible fill amount of only the bank loan dollar amount, the Partial Fill order represents an order having possible fill amounts between and including a minimum partial fill size and the order dollar amount, and the Partial Increments Only order represents an order having possible fill amounts of the minimum size, incremental amounts greater than the minimum size and less than the bank loan dollar amount in increments of an increment size, and the order dollar amount.

As a feature of this aspect, a match exists when bids and offers for the same loan with the same price have a common possible fill amount.

As yet a further aspect of the present invention, the actual offer is rounded off to the nearest even incremental dollar amount (e.g., $1,000,000) before it is posted and further information is posted that indicates whether the rounded amount is within a predetermined amount (e.g., $100,000) of the actual offer.

As yet another aspect of the present invention, a buyer can identify the maximum dollar amount of a loan that can be purchased with respect to a particular posted loan and a trade occurs if the loan is less than or equal to that maximum dollar amount, but if no trade occurs, the buyer is not informed of the actual amount of the offer.

As yet an additional aspect of the present invention, offers are rounded to the nearest million dollars prior to determining whether an offer and a bid match. Upon finding a match, it is determined if the amount to be sold is the actual offer amount, which may be an odd amount, or a rounded even dollar amount.

Still yet a further aspect of the present invention, offers are accepted only if filling them do not violate the terms (i.e., minimum retained amount and minimum assignment amount) of the bank loan.

Still yet another aspect of the present invention, a seller or buyer can enter a linked offer comprised of two orders with a different set of terms for the same bank loan, and upon filling one of these orders, the other order is automatically canceled.

Still yet an additional aspect of the present invention, after an order is partially filled in compliance with the order's terms, it is determined whether a second match exists for the unfilled portion of the order.

As a further aspect of the present invention, undisclosed bids and offers may be entered which are not posted to buyers and sellers.

As a feature of this aspect, if no match is found for an undisclosed order, then it is determined if the undisclosed offer or undisclosed bid is within a predetermined amount of a corresponding bid or offer, and if so, the parties making the respective offer and bid are contacted to see if a match can be made.

In accordance with another embodiment of the present invention, apparatus and method are provided for carrying out an auction by placing by a seller of an existing bank loan, disclosing to participants in the bank loan auction information regarding the bank loan for sale, setting by the seller start and end time parameters by designating a start time and an end time, respectively, of the bank loan auction, receiving, after the start time, bids for the bank loan for sale from the participants in the bank loan auction, closing the bank loan auction at the end time, identifying the largest participant who made the largest, and conducting a trade for the bank loan for sale between the seller and said one of the participants.

As an aspect of this embodiment, the end time parameter corresponds to an elapsed time interval amount necessary to elapse with no highest bids for the bank loan auction to close.

As another aspect of this embodiment, the auction is identified as a blind auction or as a non-blind auction, and the highest bid is posted only during the non-blind auction.

As a further aspect of this embodiment, each bid received is comprised of a price and a dollar amount, the bids are ranked by their respective price, a list is generated that includes all necessary ranked bids, starting from the highest ranking and continuing down the ranking, with corresponding dollar amounts that collectively cover the dollar amount of the bank loan, and the participants whose respective bids are included in the list are identified as the buyers.

As an additional aspect of this embodiment, the seller sets a minimum acceptable bid, and the trade is discretionary to the seller if the highest bid is less than the minimum acceptable bid.

In accordance with a further embodiment of the present invention, apparatus and method are provided for carrying out a reverse-offer bank loan auction by placing by a buyer a bid for a bank loan to be purchased, setting by the buyer start and end time parameters designating a start time and an end time, respectively, of the reverse-offer bank loan auction, receiving, after the start time, offers to sell bank loans from participants in the reverse-offer bank loan auction, closing the reverse-offer bank loan auction at the end time, identifying one of the participants who made the lowest offer, and conducting a trade for the bank loan offered for sale between the one of the participants and the buyer.

BRIEF DESCRIPTION OF THE DRAWINGS

The following detailed description, given by way of example and not intended to limit the present invention solely thereto, will be best appreciated in conjunction with the accompanying drawings, wherein like reference numerals denote like elements and parts in which:

FIG. 2 is an exemplary webpage that is displayed to users showing quote information;

FIG. 3 is an exemplary webpage that is displayed to the user when a bid or offer is initiated;

FIG. 5 is an exemplary order confirmation webpage displayed to a user upon entry of an order;

FIG. 7 is an exemplary webpage displayed to a user who seeks to schedule an auction;

FIG. 8 is an exemplary webpage displayed to a user who seeks to make a bid or offer in an auction;

FIG. 9 is an exemplary webpage displayed to a user participating or sponsoring an auction that requires the user to certify that it complies with particular restrictions of the loan's credit agreement.

DETAILED DESCRIPTION OF CERTAIN PREFERRED EMBODIMENTS

The bank loan trading system and corresponding method of the present invention, as hereinafter described, preferably is embodied within an Internet website at a particular website address such as "lexc.com," but other addresses may be used. "Users" of the present invention, generally buyers (i.e., potential assignees) and sellers (i.e., potential assignors) of bank loans, access the lexc.com website, enter pertinent and required information as set forth by the lexc.com website and the lexc.com website matches buyers with sellers, all as discussed in detail below. It is appreciated that the present invention is not limited to the Internet and may be applied to other public or non-public forums including, but not limited to, intranets.

The bank loan trading system of the present invention provides two methods for buyers and sellers to trade bank loans and also presents information with sorting capabilities for the analysis of the bank loan offerings. In the first method for matching buyers and sellers, bids and offers are posted on the lexc.com website embodying the present invention. The second method entails an electronic auction.

Matching of Bids and Offers

Figure 1:
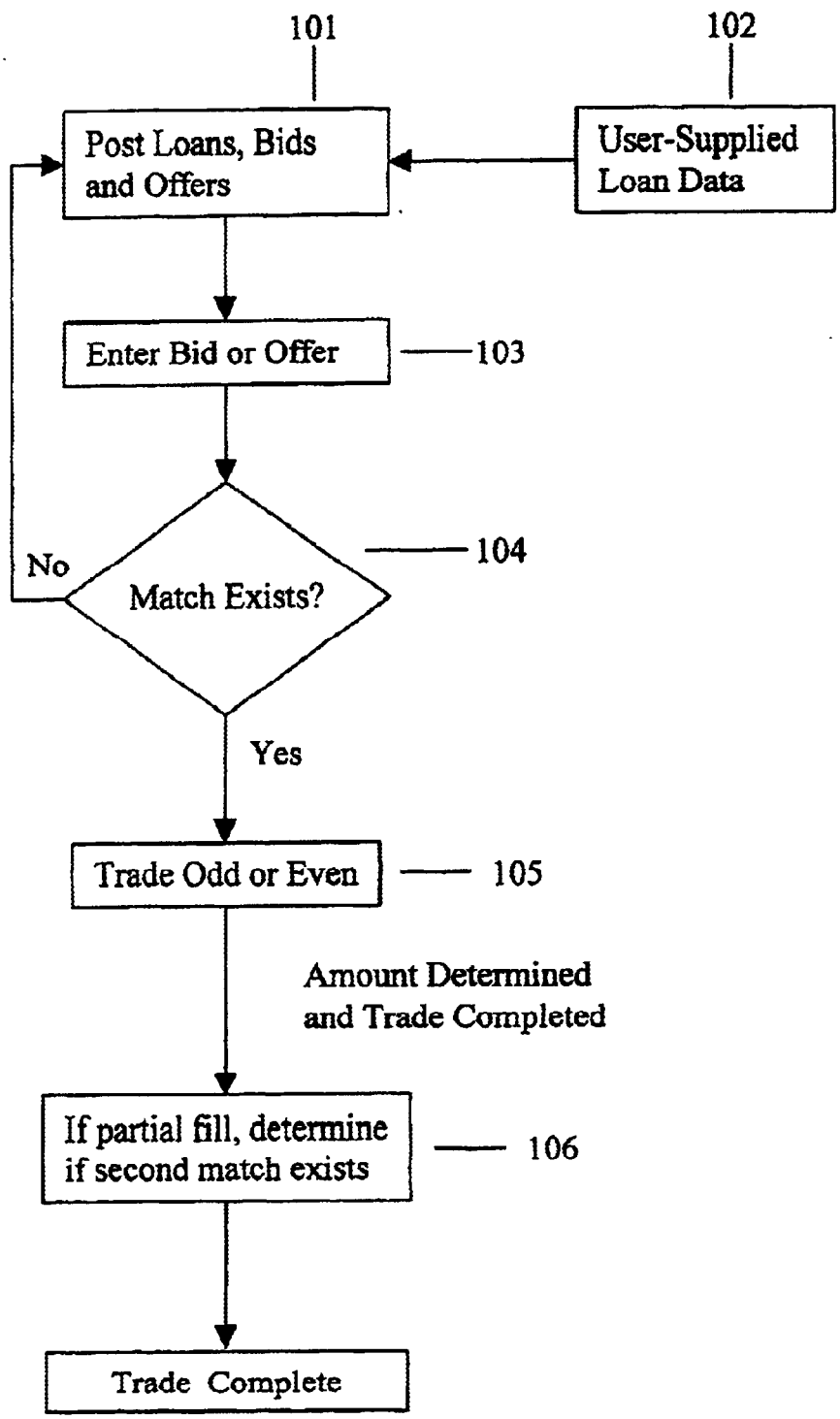
FIG. 1 is a flow chart broadly illustrating the operation of the bank loan trading system of the present invention.
Figure 2:
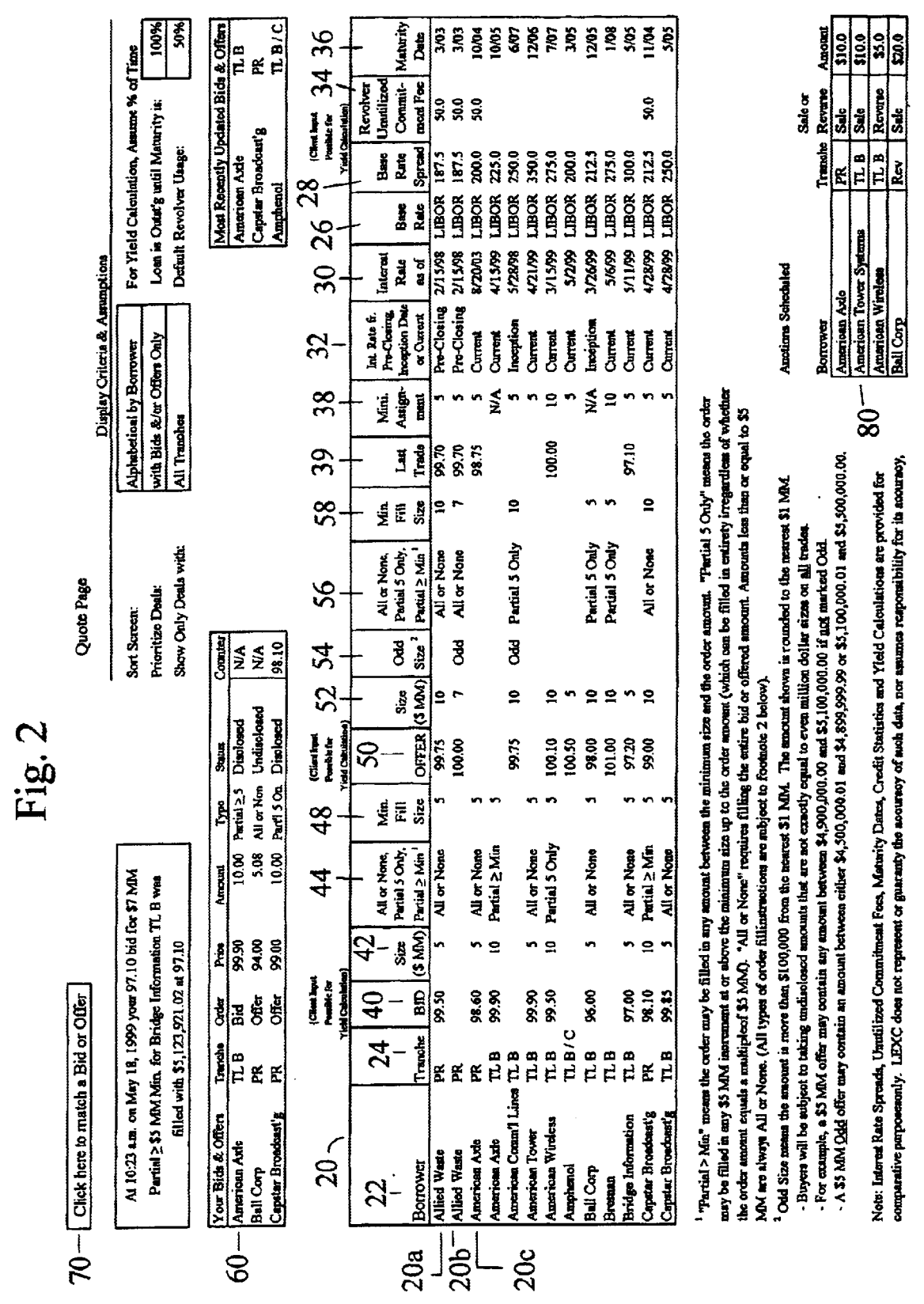

In accordance with the present invention, the matching of bids and offers is carried out by the process schematically illustrated by the flow chart shown in FIG. 1. Each process and step shown in FIG. 1 is discussed hereinafter. Initially, existing bank loans for sale are displayed to users accessing the website previously mentioned, as represented by step 101 shown in FIG. 1. FIG. 2 is an exemplary webpage that is displayed to users and for convenience herein is identified as "the quote page." Of course, existing bank loans and associated information may be displayed to users in various formats.

As shown in the quote page shown in FIG. 2, existing bank loans are shown in table 20, with each loan posted on a separate row of the table. For example, row 20a displays a loan to the company Allied Waste, row 20b displays a second loan to Allied Waste and row 20c displays a loan to the company American Axle. Generally, each loan (i.e., each row of information within table 20) includes information pertinent to the loan itself including the loan's borrower in column 22, the tranche in column 24, the loan's base rate in column 26, the loan's base rate spread in column 28, the interest rate as of date ("IRD") in column 30, whether the IRU is from pre-closing, the inception date or the current date in column 32, the revolver unutilized commitment fee in column 34, the maturity date in column 36 and the minimum assignment in column 38. If applicable, the amount of the loan's previous trade is displayed in column 39 (e.g., see FIG. 10). Other information pertinent to the loan including, but not limited to, the minimum retained amount, whether the loan interest rate is fixed or based upon a grid, the minimum retained amount, LTM or LQA, quarter ending, debt/EBITDA, EBITDA/interest, Moody's long-term rating, Moody's rating security, S&P's long-term rating, S&P's long-term rating security, and industry also may be displayed. Some of this information may change for each tranche.

The bank loan system of the present invention (hereinafter, "the system") obtains the above-identified loan information from various known sources. In accordance with the present invention, the system is capable of obtaining information about loans for sale from the users themselves, as represented by block 102 in FIG. 1. Users may enter borrowers and tranches of loans that are not already listed or posted by the system and may enter not-yet listed tranches of loans for sale having borrowers who already are listed by the system. Here, a user provides to the system the borrower's name and the tranche, and the system, either automatically or via supporting personnel, obtains the maturity date and industry of the loan. Other information regarding the loan, mentioned above, may be obtained from the user or through other means. The user-supplied information will be verified by the system and/or the supporting personnel prior to the loan's posting.

In addition to the above-mentioned loan information, table 20 shown in FIG. 2 also displays, if any exist, current bids and offers for each loan. If a bid currently exists for a particular loan, then the bid, the size of that bid, the terms of that bid and the minimum fill size are displayed in the appropriate row in columns 40, 42, 44 and 48, respectively. Similarly, if an offer currently exists for a respective posted loan, then the offer, the size of that offer, so-called odd size information, the terms of that offer and the minimum fill size are shown in columns 50, 52, 54, 56 and 58, respectively. Information regarding bids and offers shown in columns 40, 42, 44, 46, 48, 50, 52, 54, 56 and 58 are discussed further below.

The quote page shown in FIG. 2 further includes a table 60 that displays to the user information pertinent to the bids and offers made by that particular user. Other information also is displayed within the quote page, as further discussed below.

Bids and Offers

Users can enter a bid or offer pertaining to a particular tranche on the listed bank loans, as represented by block 103 in FIG. 1. Such a bid or offer is initiated by selecting an appropriate selection within the quote page shown in FIG. 2, such. as box 70 shown, or by "double-clicking" a particular row within table 20, or carrying out another appropriate event. FIG. 3 is an exemplary webpage that is displayed to the user when a bid or offer is initiated. As shown in FIG. 3, the user is asked to enter information about the loan. For example, if the minimum assignment amount is not already in the system, the user will be asked to enter the amount. If the loan has a grid for the base rate spread depending on the financial characteristics of the borrower, then the user will be asked to input the most recent base rate spread and the underlying base rate, as well as supply to the system (e.g., via a facsimile communication) a funding report that verifies the entered information. If the tranche offered is a revolver or pro rata offering of revolver and term loan, then the user will be asked to provide the unutilized commitment fee.

In addition to the above user-supplied information, the user is asked to identify how long the order (i.e., bid or offer) will be outstanding. For example, possible choices for expiration include good until cancel, good until the end of the day or good until an expiration date, hour and minute chosen by the user. In addition, orders can be canceled at any time prior to the chosen expiration time/date.

Further, the user is asked to enter the bid or offer price and the amount. As is well known, bank debt prices are measured in terms of points which equal the percentage of the par amount of the loan. For example, a price of 99.5 means the loan is priced at 99.5% of the par amount. 99.5 is also 0.5 points less than par. The price tendered and the loan amount equate to that displayed in columns 40 and 42 (for bids) and columns 50 and 52 (for offers) in table 20 in FIG. 2. The user also is asked to enter the terms of the bid or offer with regard to the size of the bank loan willing to be purchased or sold. The terms selected equates to that information displayed in column 44 (for bids) and column 56 (for offers) in table 20. If the user seeks no partial order, then "All or None" is selected thereby requiring another user's matching bid or offer to match exactly or to closely match (as discussed below with regard to "odd") the amount of the current user's order. An example of an "All or None" bid is shown in row 20c in table 20 of FIG. 2, wherein the bidder (i.e., prospective purchaser) seeks to purchase the entire $5 million of a pro rata loan to American Axle.

If the user is willing to enter into a trade of less than the entire amount of the user's own bid or offer, then the user can select one of the following two alternative set of terms. The user can select the term "Partial Fill≧Minimum Size (Partial Fill)" thereby allowing for a matching bid or offer to equal the designated minimum size (which is an even million dollar amount), to equal any even million dollar amount higher than the minimum size and at least one million less than the order amount rounded to the nearest million, or to equal the exact offered amount. As an example of this selection, a user offers $12 million with the requirement Partial Fill≧$5 million and thus the user is willing to enter into a trade in the amounts of $5 million, $6 million, $7 million upwards to $12 million (the entire amount). The user also can select the term "Partial Increments≧Minimum Size (Partial Increments Only)" as shown in FIG. 3, thereby allowing for a matching bid or offer to equal the designated minimum size, to equal any amount above the minimum in increments of $5 million or some multiple thereof (e.g., $5 million, $10 million, $15 million, etc.) as chosen by the user, or to equal the exact offer amount. As an example of this selection, a user offers $22 million with the requirement "Partial $5 Million Increments Only≧$7 Million" and thus the user is willing to enter into a trade in the amounts of $7 million (the minimum), $10 million, $15 million, $20 million (representing the partial incremental amounts) or $22 million (the ad entire amount). In another embodiment, the system trades in the amounts of, for example, $7 million (the minimum), $12 million, $17 million, (representing the partial incremental amounts) or $22 million (the entire amount). Thus, the present invention is not limited to the numbers and increments provided herein.

Transactions in Odd Amounts

Bank loans, unlike bonds, may be held in odd amounts. For example, bonds are typically issued in even $1,000 par amounts. In contrast, bank loans may be allocated amongst a bank group with odd amounts rounded to the nearest cent. In addition, even if the bank loan was allocated in even million dollar increments during syndication, prepayments and scheduled amortization payments may result in borrowers owing odd amounts to members of the bank group. As buyers and sellers may wish to maintain their anonymity, as do the system operators wish to maintain the anonymity of its users prior to the matching of bids and offers (discussed below), and revealing an exact amount offered for sale may provide information that will help identify the seller making an offer, the system displays even million dollar amounts and employs methods, rules and algorithms to provide for trades in odd amounts.

The first rule is that buyers must bid in even million dollar amounts. Sellers can make offers in odd amounts, meaning an exact amount to the nearest cent, but that amount will be displayed by the system rounded to the nearest million dollars. In addition to displaying offers rounded off to the nearest million dollars (in column 52 in FIG. 2), the system displays the previously mentioned "odd size information" (in column 54) that identifies whether the displayed amount (i.e., the rounded amount) is within $100,000 of the exact amount of the offer. If so, the odd size information column is left blank. If not, the odd size information column is provided with the term "odd." For example, an "odd" $5 million dollar offer represents an offer that falls between the values $4,500,000.01 and $4,899,999.99 or falls between the values $5,100,000.01 and $5,500,000.00. An "even" $5 million dollar offer therefore represents an exact offer of an amount within (and including) the range $4,900,000.00 and $5,100,000.00. Although it is preferred to utilize an offset of $100,000 as the gauge to identify an offer as odd or even, other amounts, such as $50,000, $75,000, $150,000, etc., may be used.

In general, since buyers are highly likely to accept nonexact offers, notification to the potential buyer that an offer either is or is not within $100,000 of the stated amount is, for most purposes, sufficient. If a buyer requires further information, that buyer may inquire further by either personally contacting (e.g., via telephone) personnel operating the system or, alternatively, making an appropriate request via his or her own computer terminal. In either case, however, the system (or its personnel) does not disclose the exact offer amount until after the order has been filled (i.e., the buyer finally accepts). For example, if the buyer can not buy more than $5,250,000 of a loan and the offer is an "odd" $5 million, the buyer can inform the system (or its personnel) of the $5,250,000 limitation. This action operates as an offer to buy the "odd" $5 million loan if the exact amount is equal to or below $5,250,000. If the exact offer amount is less than or equal to $5,250,000, then the order is filled, at which time the buyer is informed of the exact amount. On the other hand, if the exact offer amount is greater than $5,250,000, the buyer is advised only that the order was not filled. By obligating the buyer to the above process, buyers are prevented from "fishing" for information to identify who the seller may potentially be.

Figure 4A:
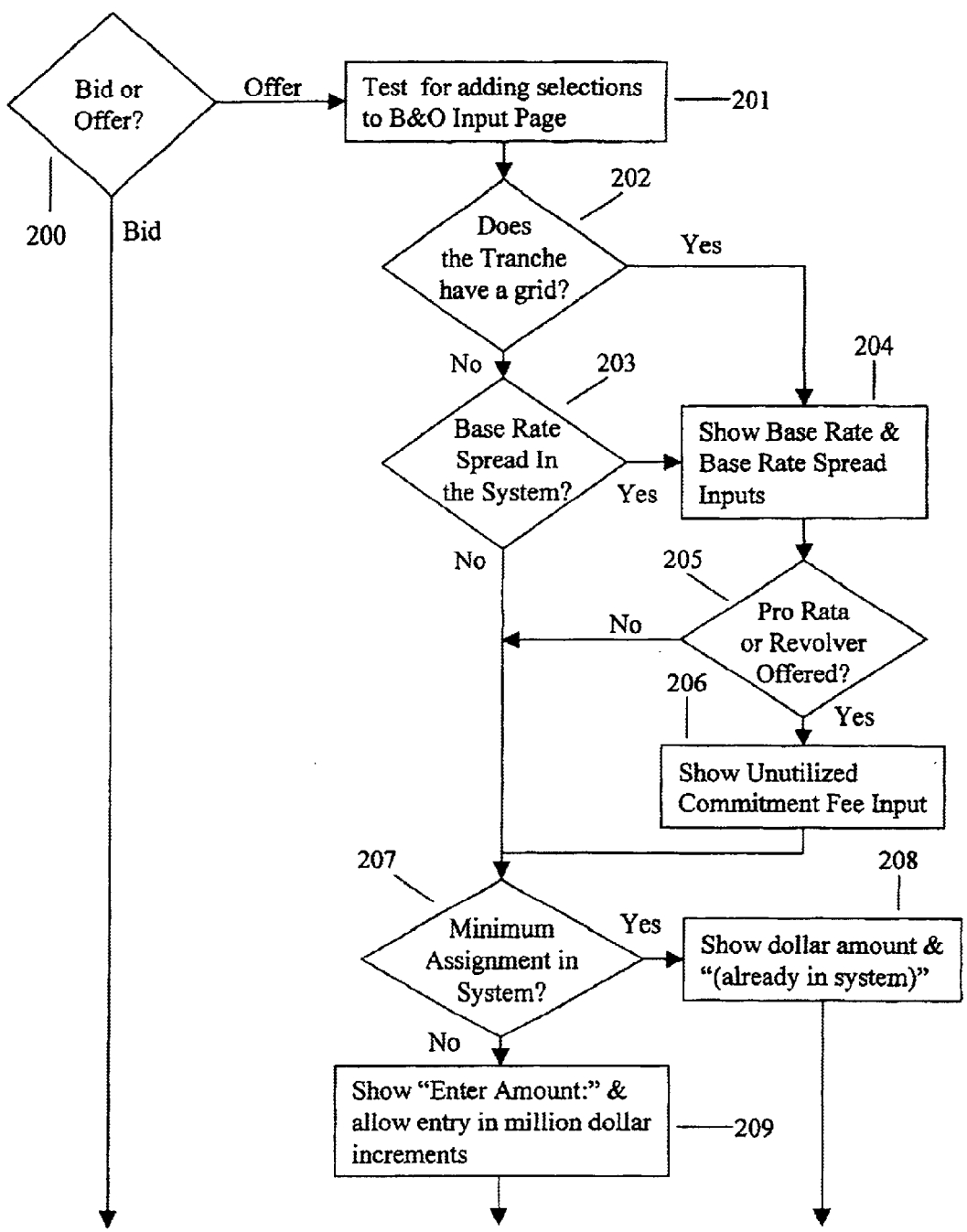
FIGS. 4A–4D represent a flow chart detailing the specific steps and inquiries taken during the offer and bid input process.
Figure 4B:
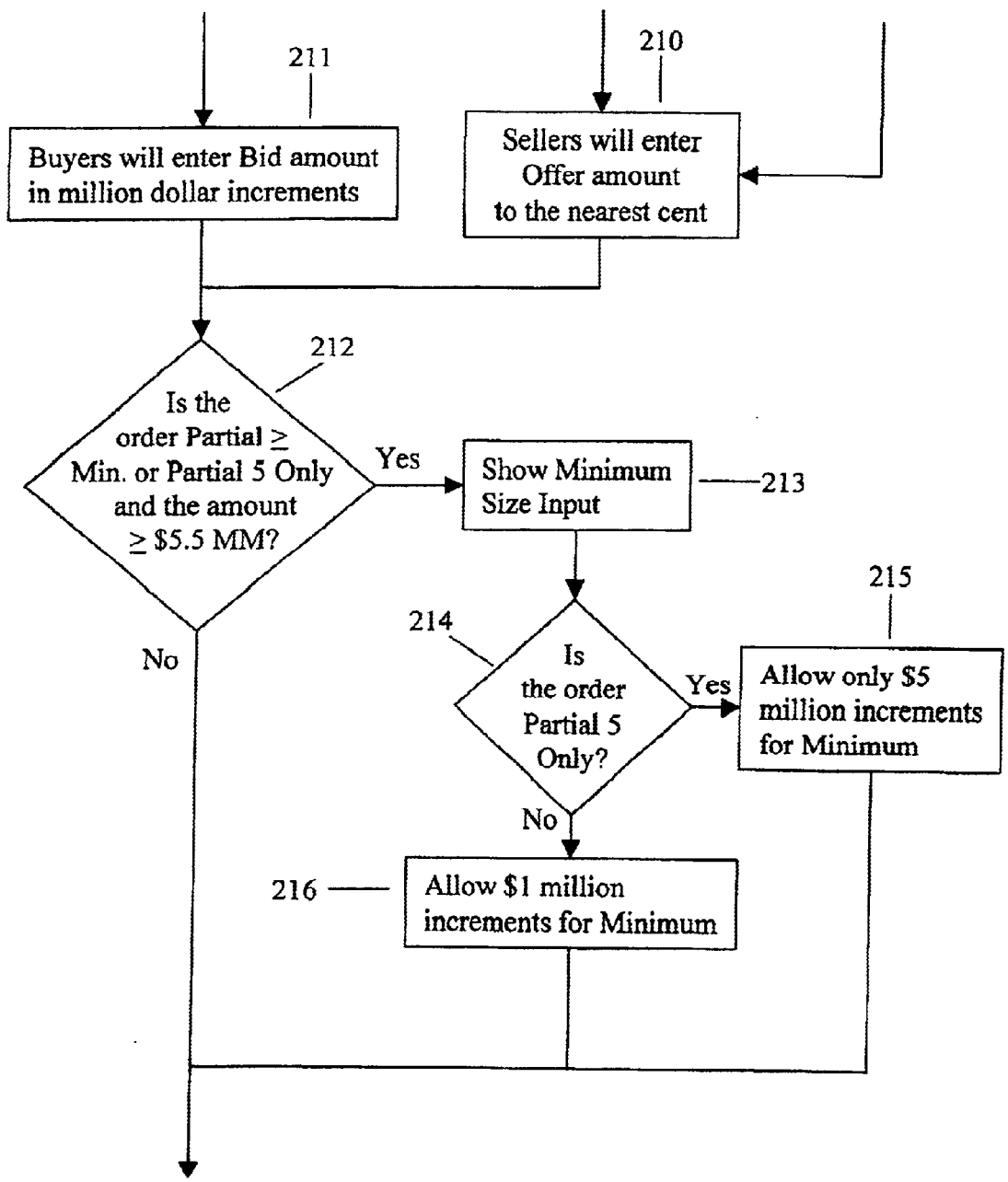
Figure 4C:
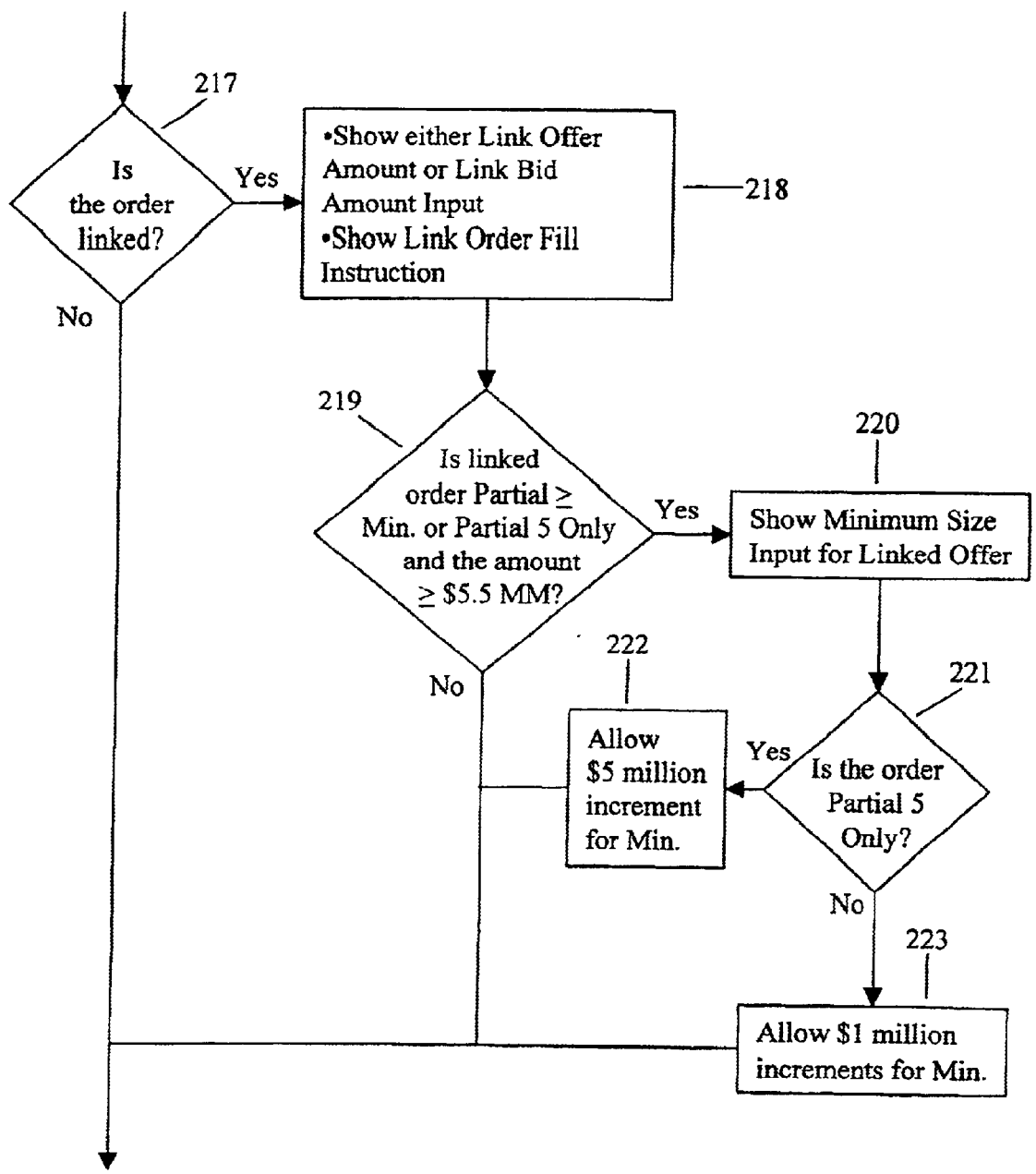
Figure 4D:
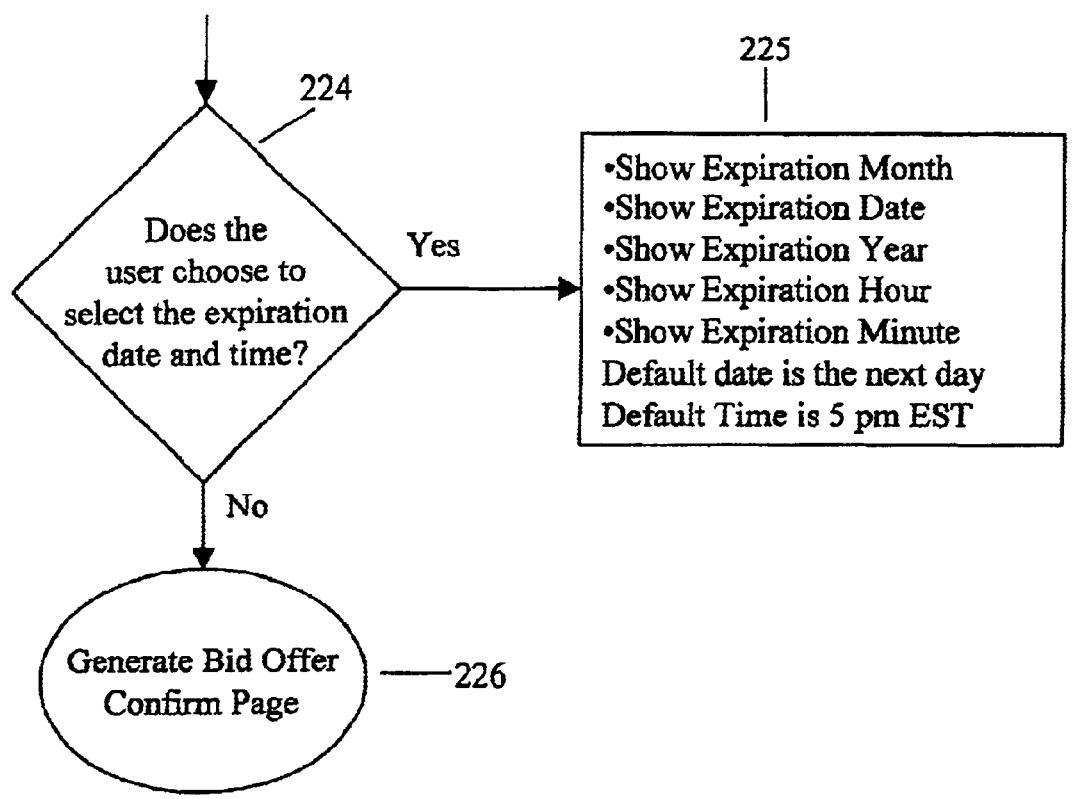

FIGS. 4A–4D represents a flow chart detailing the specific steps and inquiries taken during the above-discussed order and bid input process. As shown in FIG. 4A, inquiry 200 determines if a bid or offer is being made. For an offer, the process for determining the particular selections to be included within the bid and offer input webpage (FIG. 3) begins at step 201. Inquiries 202, 203 and 205 and steps 204 and 206 concern grid, base rate spread, pro rata and revolver information. The minimum assignment amount of the bank loan in issue is either known or entered at inquiry 207 and steps 208, 209. The seller then enters the offer at step 210 (FIG. 4B). If a bid is being made, the buyer enters the bid at step 211.

After the bid or offer is entered, inquiries pertaining to the type of bid or offer are made at steps 212–216. At inquiry 217 (FIG. 4C), the system inquires as to whether the order is "linked" (discussed below) and if so, inquiries regarding the linked order are made at steps 218–223. Finally, the user enters the expiration date and time of the offer at inquiry 224 (FIG. 4D), this information is displayed at step 225, and a confirmation page (shown in FIG. 5) is generated during process 226 (discussed below).

Matching of Offers and Bids

After at least one bid (by a potential buyer) and at least one offer (by a potential seller) pertaining to the same loan (i.e., the same borrower and tranche) have been entered into the system at the same price or at a price in which the bid exceeds that of the offer, the system carries out the process of determining whether a match exists, as represented by block 104 in FIG. 1. Initially, each offer is rounded to the nearest million dollars and, as required, each bid already is in an even million dollar amount. As previously discussed, each offer and bid can be an "All or None" type bid, a "Partial Fill" type bid, or an "Partial Increments Only" type bid. Offers and bids are compared to one another to determine whether a match exists there between. Using standard logic routines, the existence of matches between offers and bid is obtained. Table 1 below shows example bids and offers, showing both the actual offers and the offers rounded off to the nearest million dollars (in millions), the bids (in millions), as well as the amounts (in millions) of the matches that exist.

order with the lower bid or greater offer is canceled and a new order is filled.

The following priority is followed when more than one existing order matches a newly entered order: (1) best price (if a bid price exceeds an offer price, the difference between the two is split); (2) largest size (the order that allows the largest amount of the order to be filled is utilized); (3) time priority (if two existing orders match the new order and both provide the same size trade, the first order to be entered is utilized).

TABLE 1

| | | Offers & Type | | | | |
|---|---|---|---|---|---|---|
| Bid | Type | $6,123,456<br>$6 Partial ≧ 5 | $11,123,456<br>$11 Partial ≧ 10 | $6,123,456<br>$6 Partial 5 Only, Min 5 | $11,123,456<br>$11 Partial 5 Only, Min 5 | $6,123,456<br>$6 All or None |
| $7 | Partial ≧ 5 | $6 | — | $6 | — | $6 |
| $12 | Partial ≧ 10 | — | $11 | — | $11 | — |
| $7 | Partial 5 Only, Min 5 | $5 | — | $5 | — | — |
| $12 | Partial 5 Only, Min 10 | — | $10 | — | $10 | — |
| $7 | All or None | — | — | — | — | — |

After identifying whether a match exists between a particular offer and bid, the system determines whether the buyer is subject to purchase an even million dollar amount (i.e., the offer amount rounded to the nearest million) or the exact amount of the offer (i.e., the unrounded amount), as represented by block 105 in FIG. 1. If the matched amount represents the entire offer rounded to the nearest million, then the buyer is subject to purchasing the exact amount of the offer. Thus, if the entire offer is filled by a single trade, the buyer must accept the actual offer amount, which may be as much as $500,000 above or below the buyer's bid. If, on the other hand, the entire offer is not filled by the trade (i.e., the match represents an amount in millions less than the rounded-off offer), then the buyer is subject to purchasing only the matched amount, which is an even million dollar amount. Therefore, the outstanding amount of the loan still retained by the seller generally is an odd amount equal to the actual offer less the even million dollar matched amount. Table 2 below shows the example bids (in millions) and offers previously set forth in Table 1 along with the corresponding amounts of the loan to be transferred to the purchaser.

Compliance with Minimum Assignment and Retained Amount Terms

As previously discussed, the seller of a bank loan generally is imposed with two restrictions when assigning the bank loan to a buyer: compliance with the loan's minimum assignment amount and the loan's minimum retained amount. The minimum assignment amount sets a floor for the amount to be traded and the minimum retained amount pertains to the amount the assignor or seller of the bank loan will continue to hold after assignment of a partial amount of its commitment. These amounts may and often differ from the minimum fill size chosen by users in Partial Fill and Partial Increments Only order fill instructions previously discussed. The loan's minimum assignment, if known, is posted in column 38 of table 20 shown in FIG. 2, as previously mentioned. The loan's minimum retained amount may be posted in the system, but is currently not embodied in the system.

Since bank loans typically provide for both minimum assignment amount and minimum retained amount restrictions, sellers of such loans may have difficulty or be inhibited from using Partial Fill or Partial Increments Only

TABLE 2

| | | Offers & Type | | | | |
|---|---|---|---|---|---|---|
| Bid | Type | $6,123,456<br>$6 Partial ≧ 5 | $11,123,456<br>$11 Partial ≧ 10 | $6,123,456<br>$6 Partial 5 Only, Min 5 | $11,123,456<br>$11 Partial 5 Only, Min 5 | $6,123,456<br>$6 All or None |
| $7 | Partial > 5 | $6,123,456 | — | $6,123,456 | — | $6,123,456 |
| $12 | Partial > 10 | — | $11,123,456 | — | $11,123,456 | — |
| $7 | Partial 5 Only, Min 5 | $5,000,000 | — | $5,000,000 | — | — |
| $12 | Partial 5 Only, Min 10 | — | $10,000,000 | — | $10,000,000 | — |
| $7 | All or None | — | — | — | — | — |

Prioritizing Multiples Bids and Orders

Generally, a "better" bid for a particular loan is represented by a second bid of the same dollar amount as the first bid but the second bid has a higher price than the first bid. Similarly, a "better" offer is represented by a second offer of the same dollar amount as the first offer but the second offer has a lower price than the first offer. In these instances, the order fill instructions since a partial fill (i.e., an assignment of a portion, not the entire amount, of the loan) may result in the seller retaining less than the minimum retained amount. For example, a seller owns a $17 million loan with a minimum retained amount restriction of $5 million, and the seller seeks to sell as much of the bank loan as possible. Given this scenario, the seller offers the entire loan as a $17 million Partial≧$5 million offer. However, a buyer's purchase of $15 million results in the seller retaining $2 million in violation of the bank loan credit agreement.

To solve the aforementioned loan violation from occurring, the system of the present invention allows users to create so-called "linked" orders. A user (a buyer or seller) may enter two bids or two offers with respect to the same loan, and then "link" those bids or offers so that when one of those bids or offers is filled, the other is immediately canceled. Given the above example wherein the seller owns a $17 million bank loan with a minimum retained amount restriction of $5 million, the seller can enter a $12 million Partial≧$5 million offer (as the first order) and then enter a second linked order as a $17 million All or None offer. If the second order is filled, then the first order is canceled. Conversely, if the first order is filled, the second order is canceled. Table 3 below illustrates the possible outcomes for this example. Since the system seeks to fill the largest orders first, the All or None offer is first attempted to be filled prior to filling partial orders.

TABLE 3

| Linked Order | Amount Sold | Amount Retained |
| --- | --- | --- |
| $12 million Partial ≧ $5 million | $5,000,000 | $12,000,000 |
| | $6,000,000 | $11,000,000 |
| | $7,000,000 | $10,000,000 |
| | $8,000,000 | $9,000,000 |
| | $9,000,000 | $8,000,000 |
| | $10,000,000 | $7,000,000 |
| | $11,000,000 | $6,000,000 |
| | $12,000,000 | $5,000,000 |
| $17 million All or None | $17,000,000 | $0 |

Additional Trade on Retained Amount

If less then the entire amount of an order (bid or offer) is filled, then the system checks whether the amount of the loan retained by the seller or the amount of a bid still unfilled can be filled, as represented by block 106 in FIG. 1. That is, if an offer is partially filled (by the first match), then the system determines whether the unfilled amount (i.e., the amount retained by the seller) can be filled by another bid (a second match). Similarly, if a bid is partially filled (with the first match), then the system determines whether the unfilled amount (i.e., the difference between the bid and the first match) can be filled by another offer (a second match).

The above determination of whether a second match is possible (and, if possible, a third match, a fourth match, etc.) is carried out for both linked and non-linked orders. During this determination process, the system repeats the above-discussed matching process for the unfilled amounts and assumes a Partial Fill order fill instruction. This assumption maximizes the chance of a second match. Alternatively, although not preferred, the type of order for unfilled amounts for both offers and bids use the same type of order as the original order (i.e., "Partial Fill" or "Partial Increments Only"). If second and subsequent matches are found, the user(s) involved are notified that their offers or bids that are not fully satisfied (i.e., the entire amounts thereof are not bought or sold) can be filled fully or partially by one or more additional trades, depending on the circumstances. Since users generally are obligated to conduct only one trade per offer or bid, a user can decline subsequent trades.

Avoiding Broken Trades—Possible Order Fill Amounts and Seller Compliance Representation The present invention seeks to prevent the user's ability to "break" trades, that is, not complete a trade after a match has been made. One possible way for a seller to break or not close a trade is when the actual carrying out of that trade would be in violation of the bank loan's minimum assignment amount or minimum retained amount restrictions. If such non-closure of trades were allowed, then buyers may miss opportunities to purchase loans elsewhere possibly resulting in increased expense to the buyer. All of this in turn may result in loss of support for the system by the users themselves.

To prevent the foregoing possible non-closure of trades from occurring, the system has a number of safe-guards, one of which is its confirmation process. Firstly, upon entry of an order (offer or bid), the user's order is posted to that user as an order confirmation webpage, such as shown in FIG. 5. The order confirmation webpage may repeat some or most of the information that the user entered in the Bid and Offer Input page shown in FIG. 3. The order confirmation webpage further repeats the offer or bid amount with the associated fill instructions (i.e., "All or None", "Partial Fill", "Partial Increments Only") and all of the, fill amounts that can satisfy the order. This information presented to the user ensures that the user is aware. of the possible outcomes of the order and bears most significance in the requirement that the seller represent that the minimum assignment amounts and minimum retained amounts as provided in the credit agreement are complied with.

Table 4 below shows exemplary offer amounts and fill instructions that may be entered by a seller and the "possible fill amounts" that would be provided to the user upon entry thereof. Similarly, Table 5 below shows exemplary bid amounts and fill instructions that may be entered by a buyer and the "possible fill amounts" that would be provided to the user upon entry thereof.

TABLE 4

| Example Offer Amount & Fill Instructions | Possible Fill Amounts |
| --- | --- |
| $5,123,456.00 All or None | $5,123,456.00 |
| $10,123,456.00 Partial 5 Only, Min. 5 | $5,000,000.00 or $10,123,456.00 |
| $12,123,456.00 Partial 5 Only, Min. 5 | $5,000,000.00 or $10,000,000.00 or $12,123,456.00 |
| $12,123,456.00 Partial ≧ Min. 5 | $5,000,000.00 or $6,000,000.00 or $7,000,000.00 or $8,000,000.00 or $9,000,000.00 or $10,000,000.00 or $11,000,000.00 or $12,123,456.00 |
| Linked Offers of:<br>(1) $12,123,456.00 Partial ≧ Min. 5; and<br>(2) $17,123,456.00 All or None | $5,000,000.00 or $6,000,000.00 or $7,000,000.00 or $8,000,000.00 or $9,000,000.00 or $10,000,000.00 or $11,000,000.00 or $12,123,456.00 or $17,123,456.00 |

TABLE 5

| Example Bid Amount & Fill Instructions | Possible Fill Amounts (all may be in odd million amounts) |
| --- | --- |
| $5 million All or None | $5 million |
| $10 million Partial 5 Only, Min. 5 | $5 million or $10 million |
| $12 million Partial 5 Only, Min. 5 | $5 million or $10 million or $12 million |

TABLE 5-continued

| Example Bid Amount & Fill Instructions | Possible Fill Amounts (all may be in odd million amounts) |
|---|---|
| $12 million Partial ≧ Min. 5 | $5 million or $6 million or $7 million or $8 million or $9 million or $10 million or $11 million or $12 million |
| Linked Offers of: (1) $12 million Partial ≧ Min. 5; and (2) $17 million All or None | $5 million or $6 million or $7 million or $8 million or $9 million or $10 million or $11 million or $12 million or $17 million |

The order confirmation webpage further requires a seller to confirm that if a trade is conducted, that such trade would not be in violation of any relevant credit documents, specifically the minimum assignment amount and minimum retained amount restrictions thereof, regardless of whether the order was partially or fully filled. Since sellers already have the credit documents by virtue of their participation in the bank loan facility and buyers may not necessarily already be in the facility and have access to the credit agreement, the onus is on sellers to confirm that only amounts equal to or in excess of the minimum assignment amount can possibly be traded and any retained amount be equal to or in excess of the minimum retained amount.

The order confirmation page further may request that the seller confirm the amount of the minimum assignment amount of the credit agreement, for example, by sending via facsimile a copy of the credit agreement containing such information, if such information was not already confirmed.

Undisclosed Orders

The present invention further allows users to place undisclosed orders within the system. Undisclosed orders (bids or offers) are identical in all respects to the previously discussed bids and offers, except they are not displayed to users (e.g., on the quote page shown in FIG. 2). By providing an undisclosed bid or offer, the user's order will not move the price of the loan against that user's position, whereas a disclosed order might move the price. Generally, when a borrower is experiencing financial or operating difficulty, the placement of an offer to sell a loan concerning that borrower may induce other potential sellers to post offers at lower prices. This disadvantageous result to the seller is prevented by placing an undisclosed order.

As with disclosed orders, if an entered order matches an undisclosed order, a trade takes place. However, if a bid and an offer are within 1.5 points (or other suitably close position) of one another and one or both of the bid and offer are undisclosed, the system or, alternatively, the system's personnel determines the likelihood of a trade taking place. If a trade is likely to occur, then the two users involved are notified of the proximity of the opposing orders. The system or personnel will then negotiate with both sides to complete a trade. This additional intervention by the system advantageously results in trades that otherwise would not take place when undisclosed orders are involved.

Figure 6A:
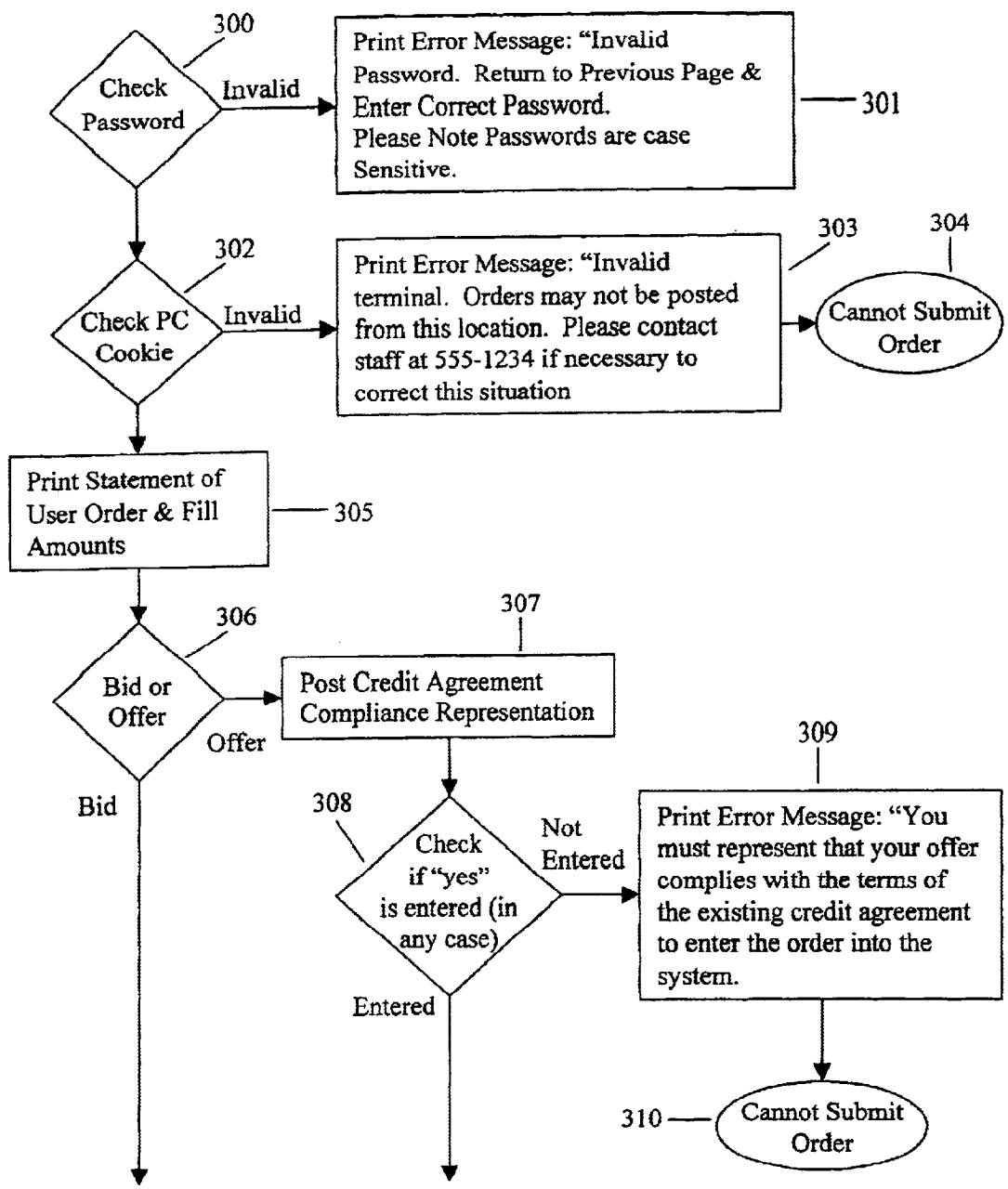
FIGS. 6A–6G represent a flow chart detailing the specific steps and inquiries taken during confirming the order and matching of bids and offers in accordance with the present invention.
Figure 6B:
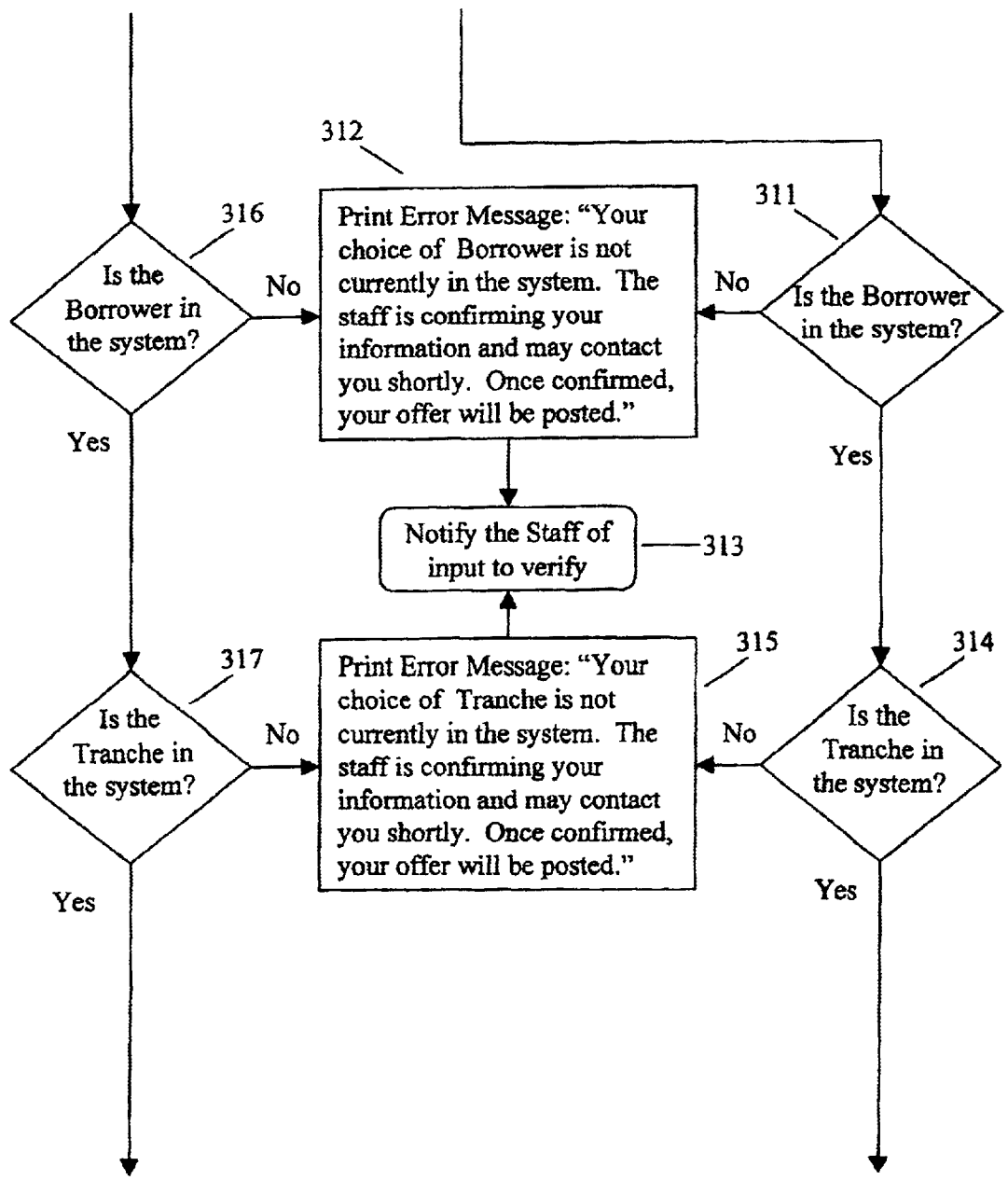
Figure 6C:
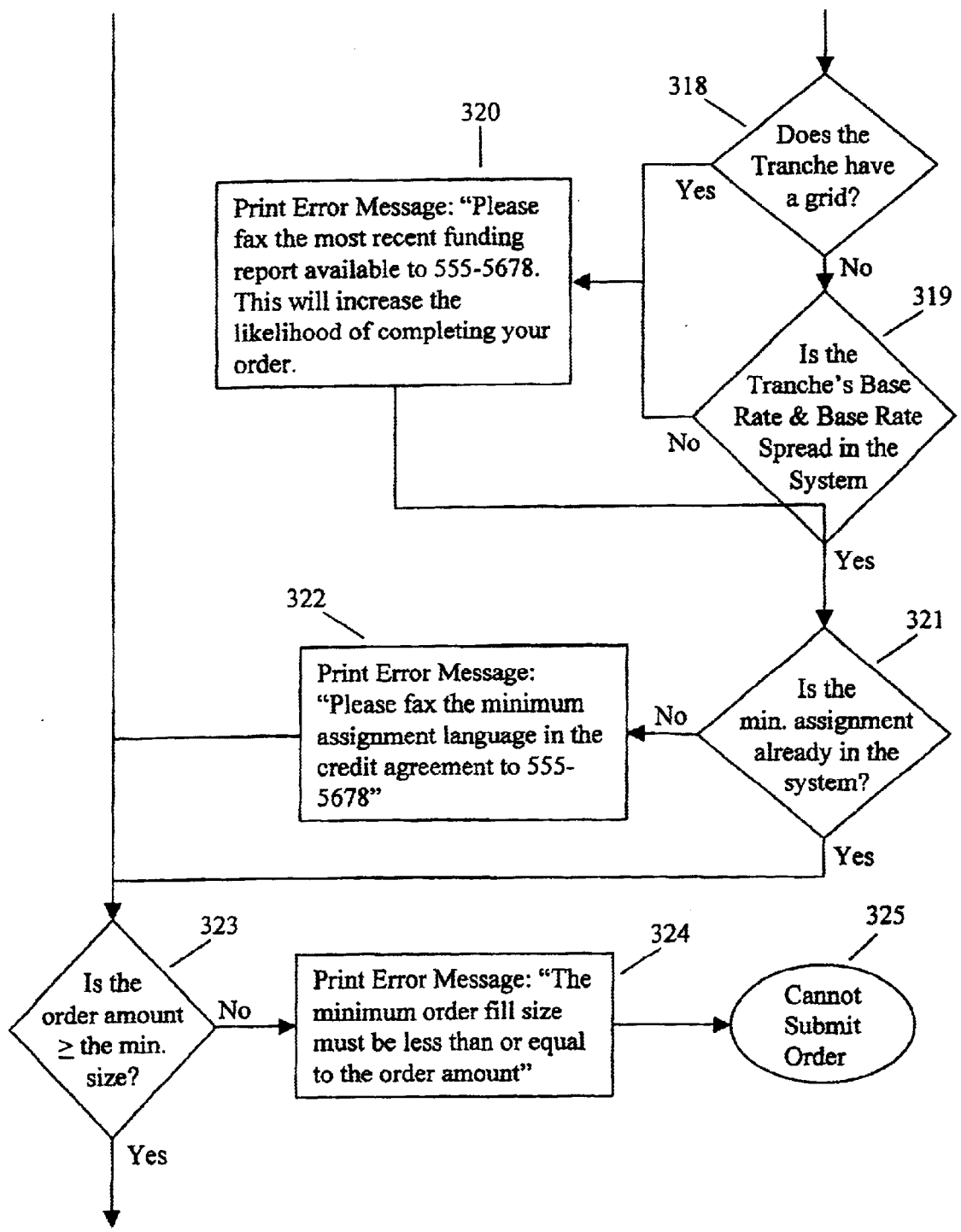
Figure 6D:
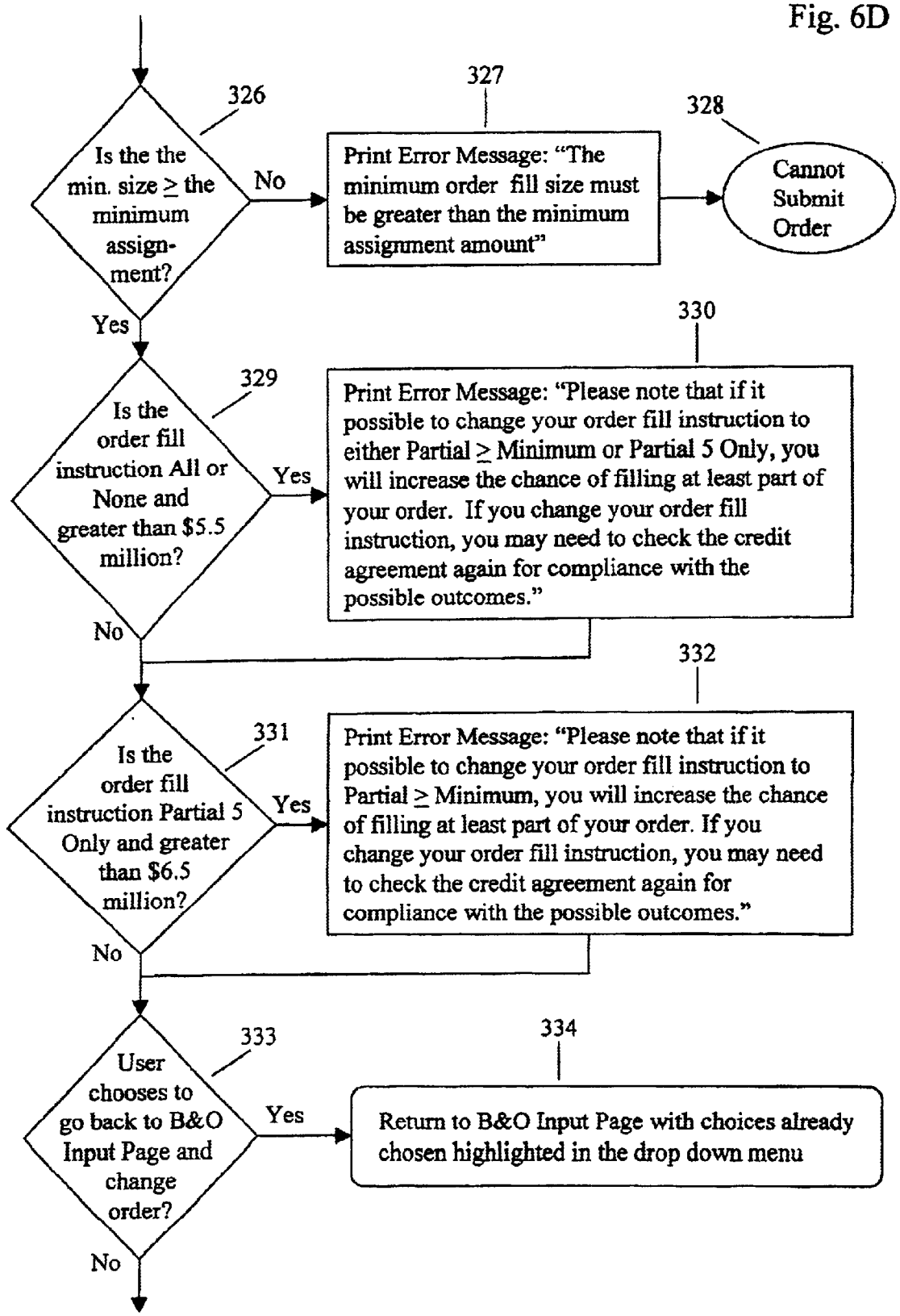
Figure 6E:
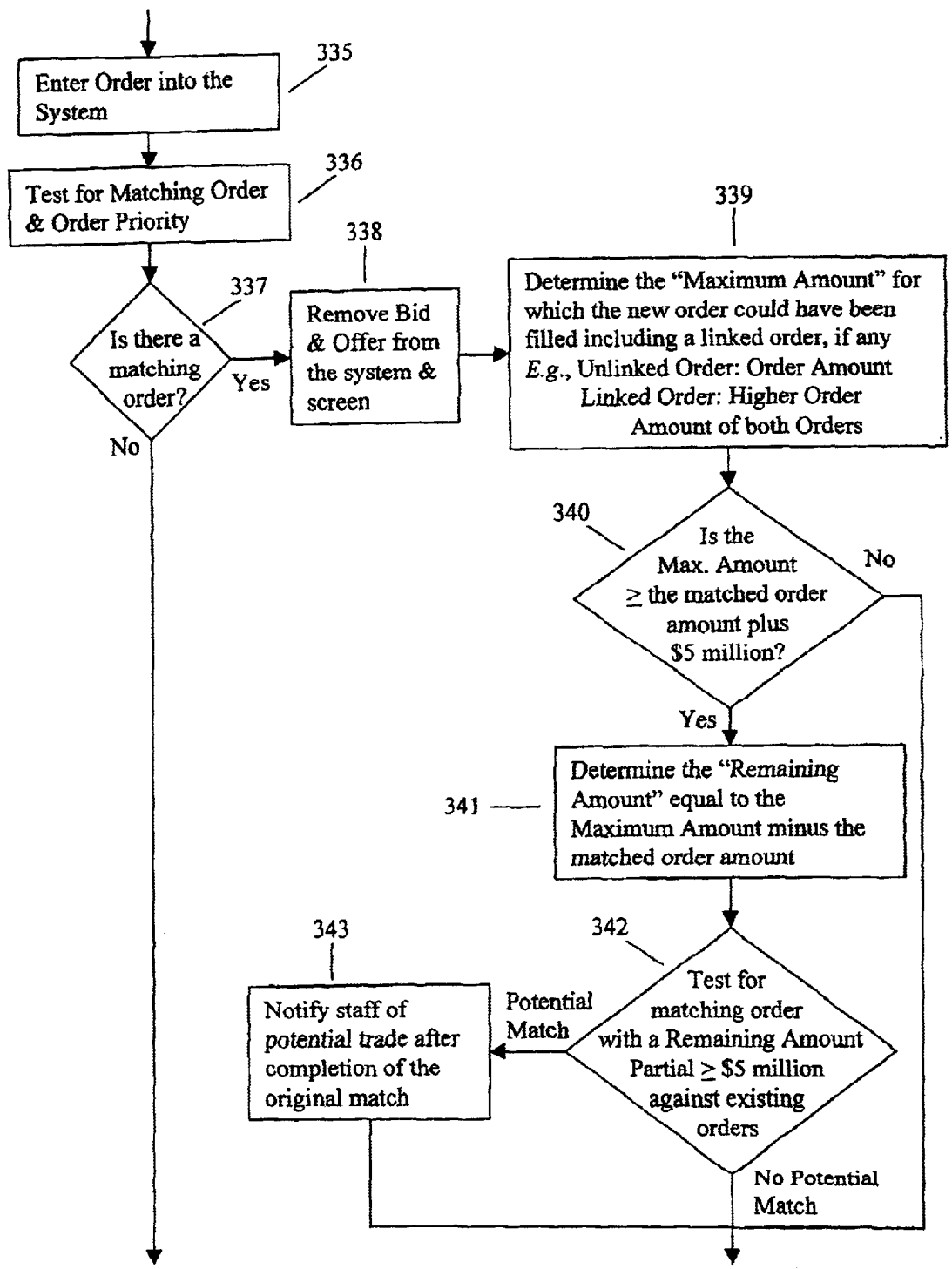
Figure 6F:
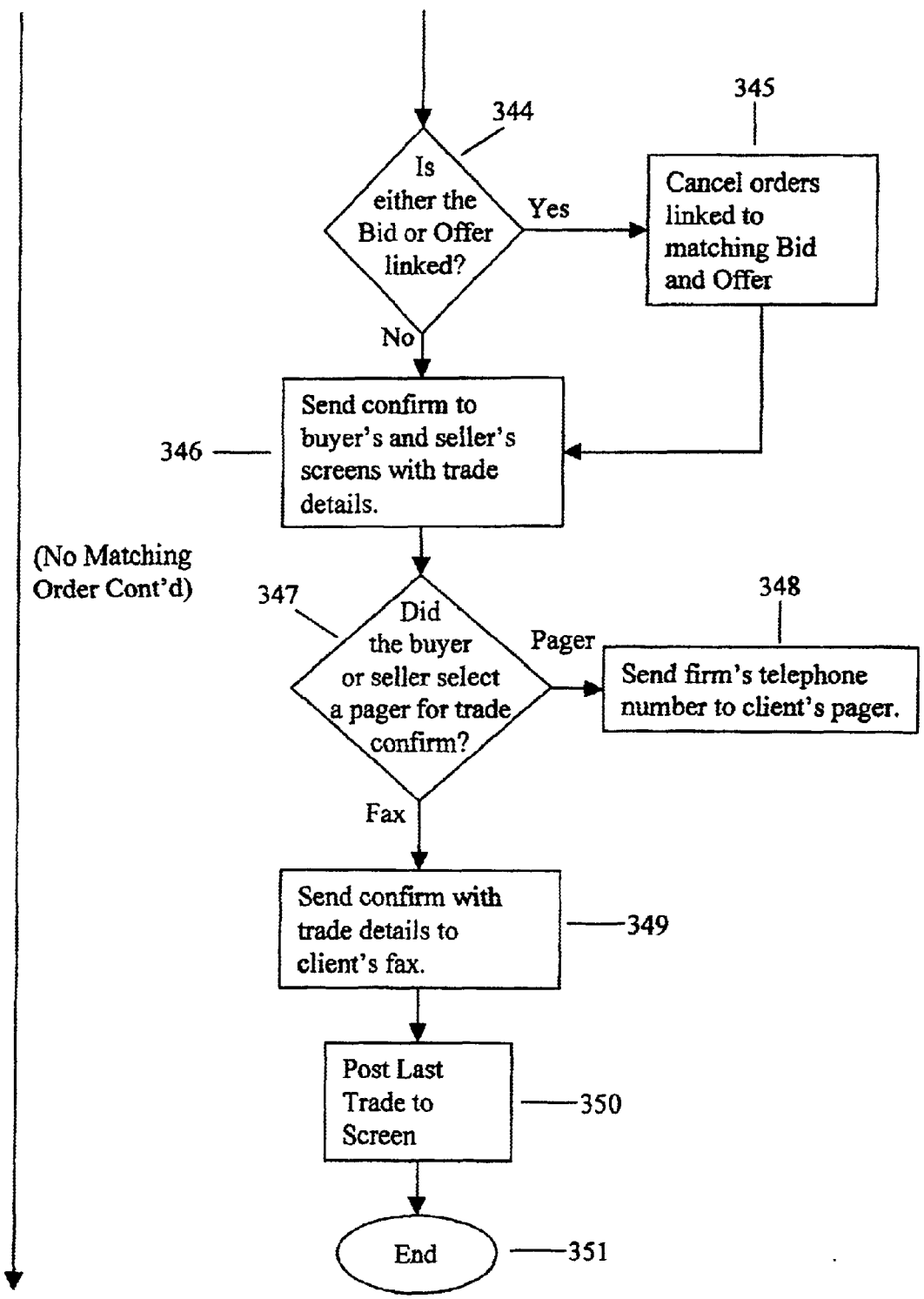
Figure 6G:
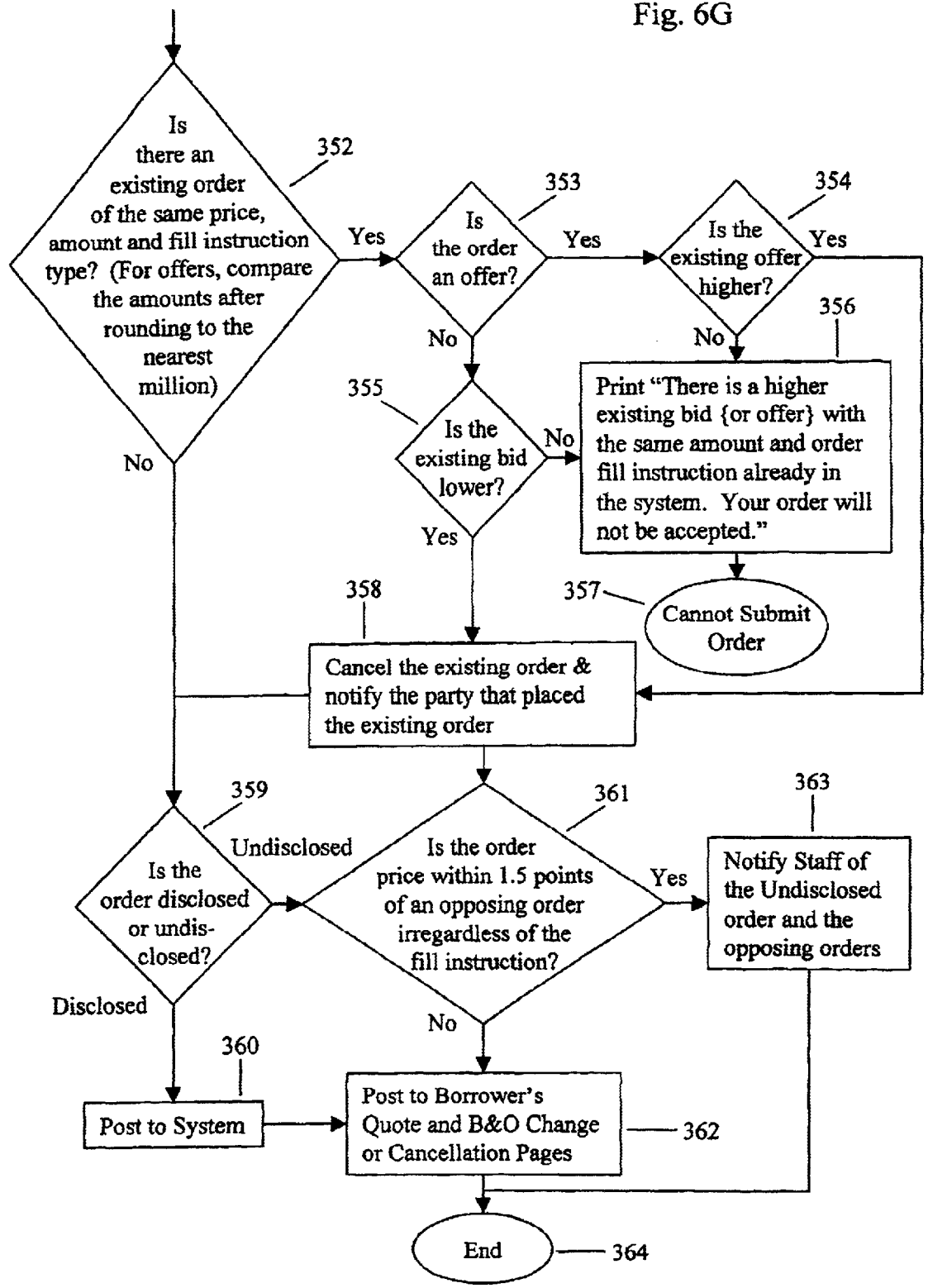

The above-discussed functions and features of confirming the order and matching of bids and offers, whether disclosed or undisclosed, with the various confirmations are further schematically illustrated in the flow chart shown in FIGS. 6A–6G. Steps 300–304 concern user authentication security measures. User order information is printed at step 305 and based upon whether the order is a bid or an offer, as determined at inquiry 306, the process proceeds to step 307 for an offer and inquiry 316 (FIG. 6B) for a bid. Steps 307–310 concern compliance with the credit agreement. Inquiries 311 and 316 determine if the indicated borrower is in the system and if not, a user message is provided at step 312. Similarly, inquiries 314 and 317 determine if the indicated tranche is in the system and if not, a user message is provided at 315. The system's personnel is notified at step 313. For offers, the system verifies that the grid or that the tranche's base rate and base rate spread are in the system at inquiries 318 and 319 (FIG. 6C). If not, the user is informed at step 320. Whether the minimum assignment information is in the system is determined at inquiry 321 and if not, the user is asked to provide proof of the minimum assignment amount at request 322.

Inquiry 323 verifies that the order amount is not less than the minimum size indicated. If it is, steps 324–325 advise the user. Inquiry 326 (FIG. 6D) verifies that the minimum size indicated is not less than the minimum assignment amount. If it is, steps 327–328 advise the user. Steps 329–332 concern providing advice to the user concerning the order, if necessary. Inquiry 333 and step 334 allow the user to return to the bid and offer input webpage, if desired.

At step 335 (FIG. 6E), the order is entered into the system and at step 336, the process for finding a match for the order begins. Inquiry 337 determines it a match exists and if so, steps 338–351 (FIGS. 6E and 6F) are carried out. If, on the other hand, no match exists, then the system determines if another similar bid or offer already exists at inquiry 352 (FIG. 6G) and steps 353–358 determine which bid is greater or offer is lower and cancels the other bid or offer. Then, if the order currently being made is accepted, inquiry 359 determines if it is an undisclosed order. If so, an inquiry is made as to whether the order is within 1.5 points of an opposing order at inquiry 361 and if so, system personnel are notified at step 363. Disclosed orders are posted by the system at step 360.

Auctions

In addition to the above-described method and facility for matching buyers with sellers of bank loans, the bank loan trading system of the present invention further utilizes electronic auctions on the lexc.com website (or other suitable site), as discussed below.

Currently, in the bank loan market, auctions generally are conducted by the firm selling (or buying in a reverse-offer auction) the bank loan. This firm is also referred to as the sponsor of the auction. As previously mentioned, without clearly-defined rules and a third party following generally accepted or standardized procedures, many auctions are conducted with less than fair and equitable results. This in turn discourages participants from engaging in announced auctions for fear their due diligence prior to their participation will become a wasted effort. Accordingly, participants often will not participate or put their best efforts or bids into an auction. With reduced participation due to a history of poorly conducted auctions by various sponsors, sponsors likely experience lower bids or higher reverse-offers. Furthermore, since the participants in auctions are generally dealer desks, these dealers are receiving their compensation from the difference in the price paid by the dealer's buyer and the bid provided to the sponsor. This further reduces the amount received or increases the amount paid by the sponsor.

In accordance with the present invention, the system (via its website) provides clear rules that ensures fair and equitable execution of bank loan auctions. In addition, the system of the present invention bypasses dealers, thereby increasing the proceeds or reducing the purchase cost to the sponsor. Three types of auctions may be carried out by the present invention: standard, blind and dutch. Table 80 shown in FIG. 2 provides various information regarding currently scheduled auctions and FIG. 7 is an exemplary webpage displayed to a user who seeks to schedule an auction. FIG. 8 is an exemplary webpage displayed to a user who seeks to make a bid or offer in an auction.

Standard Auctions

The system of the present invention allows the user to schedule a so-called "standard auction" which places a bank loan for sale to the highest bidder until the "gavel falls." A pre-announced start date and time and the allotted time "before the gavel falls" are provided by that user. At the start of the auction, the system accepts bids and continuously posts the highest bid. This type of auction remains open so long as increasing bids continue to be entered. The action closes after no new bids are received for a stated interval of time. Therefore, the system continues to conduct the auction until an amount of time, e.g., five minutes, has elapsed since the last bid was entered. During the auction, the current highest bid and the amount of time remaining (which time is reset upon receipt of a new highest bid) are posted to users. Reverse offers also are possible and operate in a similar manner. The system "refreshes" the information displayed to users at a rate significantly faster than the amount of time that must elapse before the auction closes, thus ensuring that the Internet-conducted auction is fair to all users. For example, the system may provide a refresh rate of 15 seconds versus 5 minutes for the period for the gavel to fall.

Blind Auctions

The system further allows users to schedule so-called blind auctions at a preset date and time. In a blind auction, the auction closes at a pre-announced time, but bids, including the highest bid, are not posted by the system to either the auction's participants or the sponsor of the loan. This ensures that all participants equally lack bidding information. Reverse-offer blind auctions also may be scheduled.

Dutch Auctions

The system also allows users to schedule dutch auctions, which are similar to blind auctions, but provide for the sale of the loan (or purchase of a loan in a reverse offer) to one or more participants. Thus, while blind auctions can be considered to be an All or None type order, Dutch auctions may be partially filled by a number of auction participants. In the Dutch auction, the auction price for all purchasers is the lowest bid made by the eventual purchasers (representing the highest bidders) or, in the case of a reverse offer, is the highest offer made by the eventual sellers (representing the lowest offerors). Table 6 below shows example bids made during a Dutch auction sale of $50 million of a loan.

TABLE 6

| Rank of Bid | Bid Amount | Price Bid | Amount Sold to Bidder |
|---|---|---|---|
| Bid #1 | $15 million | 98.50 | $15 million |
| Bid #2 | $20 million | 98.25 | $20 million |
| Bid #3 | $25 million | 98.00 | $15 million |
| Bid #4 | $20 million | 97.76 | $0 |
| Bid #5 | $10 million | 95.50 | $0 |

Participants providing Bid #1, Bid #2 and Bid #3 would all pay 98.00.

Equitable Auctions

Once an auction is entered or posted by the system, it may not be removed. Sponsors are required to place a minimum acceptable bid for which they will sell their loan or a maximum acceptable offer for which they will pay for a loan in a reverse-offer auction. Thus, the sponsor is not forced to accept below-market bids or above-market offers and participants are assured that if they place a bid above the a minimum acceptable bid or an offer below the maximum acceptable offer, the sponsor cannot refuse such bid or offer if no better bid or offer exists. Therefore, the participant knows that if the minimum acceptable bid or maximum acceptable offer is reasonable, then it may not be a waste of time to conduct due diligence to participate in the auction because the auction can not be stopped prior to completion. In addition, knowing that their bid or offer can not be shopped at the end of the auction provides the participant with the knowledge that his effort to make a bid or offer will not be inappropriately used by the sponsor to achieve a better bid or offer from a favored third party. Bids and offers may be entered that fall below the designated minimum acceptable bid or above the maximum acceptable offer, respectively. In the case that the highest bid still falls below the minimum acceptable bid or the lowest offer still is above the maximum acceptable offer, the system provides the sponsor the opportunity to accept or reject the best bid or offer.

The system further allows the sponsor of an auction, prior to or during the auction, to modify various criteria previously set but only if such modification increases the likelihood of a completed trade. The system allows the sponsor to decrease its minimum acceptable bid and, similarly, to increase its maximum acceptable offer. Such changes could only tend to increase the likelihood of a successful, completed trade. Increasing the minimum acceptable bid or decreasing the maximum acceptable offer disadvantageously decreases the likelihood of a completed trade and thus is forbidden.

The system further allows participants in an auction to only increase their bids or decrease their offers (in a reverse-offer). In dutch auctions, participants can also increase the dollar amount tendered, but not decrease it.

Auctions Must Comply with Credit Agreement

Whether the sponsor or the participant is the seller in a sale auction or reverse-offer auction, respectively, the system requires the seller to represent its compliance with the minimum assignment and retained amounts restrictions of the credit agreement. FIG. 9 is an exemplary webpage displayed to a user sponsoring and participating in an auction that requires the user to certify that it complies with these restrictions of the credit agreement.

System Analytics and Sorting Capability

Figure 10:
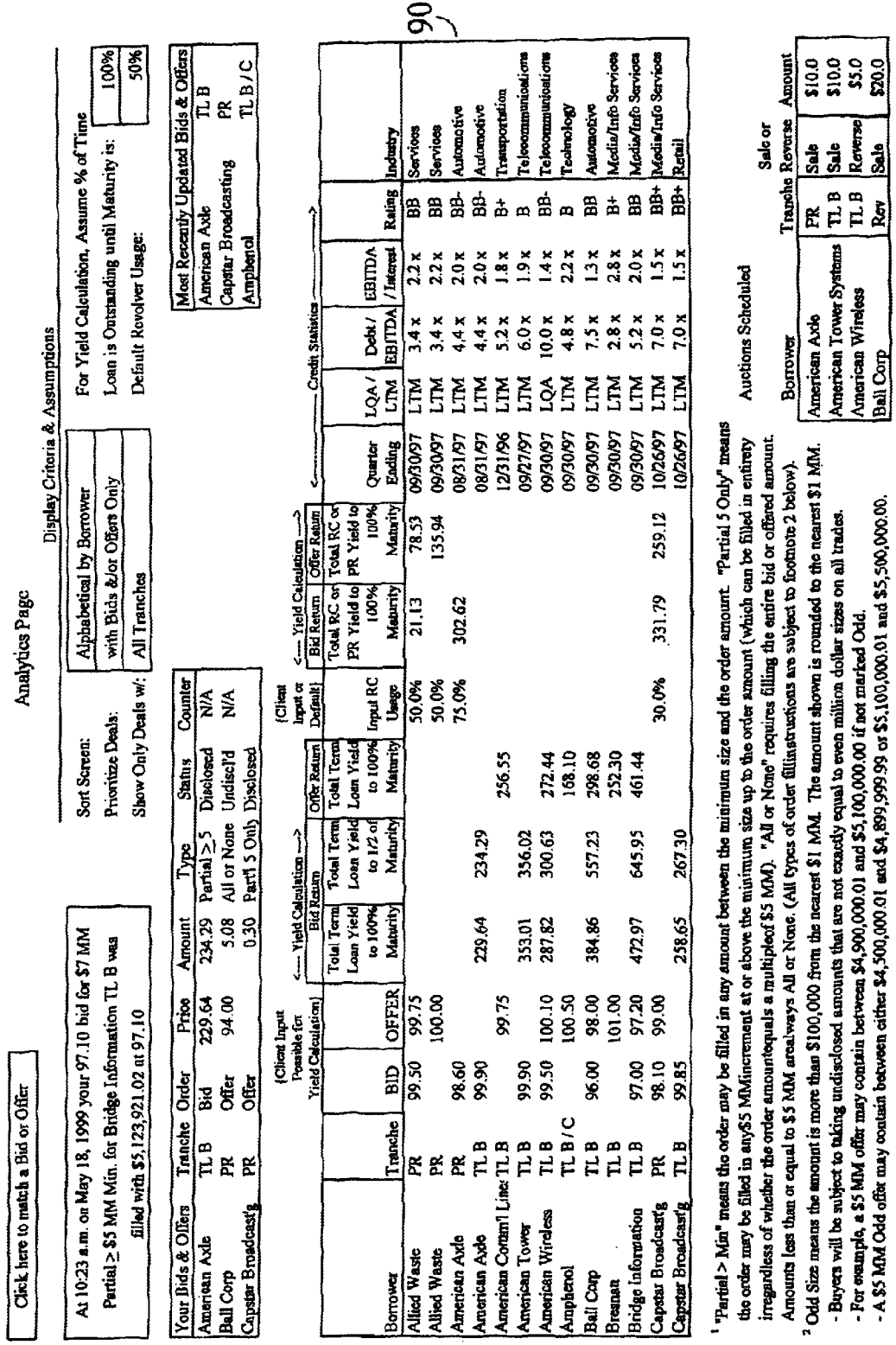
FIG. 10 is an exemplary analytics webpage that can be displayed to a user.

In addition to the foregoing matching of sellers and buyers of bank loans and bank loan auctions, the system of the present invention further allows users thereof to arrange the aforementioned bank loan data, including the offers and bidders thereof, in different manners on the users' computer monitors. FIG. 10 is an exemplary so-called analytics webpage that can be displayed to a user. Table 90 shown in FIG. 10 is similar to table 20 shown in FIG. 2, but table 90 is adapted for the purpose of comparing posted loans in different manners. For example, loans shown in table 90 can be sorted using any column therein as the sorting criteria. Thus, loans can be sorted chronologically depending on their quarter ending date, loans can be sorted numerically based on their total yield to an assumed maturity date (chosen as a percentage of time until maturity), and so on. For the sort on the yield, the system can assume the loan is outstanding for only 50% of the stated time until maturity. Therefore a premium or discount is amortized in half the amount of time, thereby reducing or increasing the yield, respectively. Given this feature of the present invention, users are able to quickly and easily obtain useful information helpful in their decision to make appropriate bids and offers.

In accordance with a further embodiment of the present invention, the disclosed system and corresponding method may be applied to the trading of bonds whereby setting matching rules or utilizing auctions could increase the liquidity for, or in other words increase the number of buyers and sellers interested in, the trading of bonds. Since most bonds are traded over-the-counter, therefore through dealers acting as middlemen rather than through exchanges, and the trading in any particular issue of bond is generally not as active as with stocks, there are generally a limited number of dealers through which an investor can buy or sell the desired bonds. Due to this lack of trading in any given bond, the cost of execution is generally more expensive for bonds than stocks due to a lack of liquidity or demand for secondary purchases of the bonds. Therefore dealers acting as middlemen have to spend more time and effort to execute transactions. In addition, with limited competition and limited publication of market prices, the dealers may charge a large amount or excessive mark-up for trade execution.

With the present invention applied to bonds, execution could be significantly more efficient as the number of potential buyers or sellers could increase and contacting these investors would be less expensive, thereby reducing the cost of execution. Furthermore, the rounding and matching method described in the present invention could increase the number of trades executed as it provides a method for matching buyers and sellers of unusual amounts and sizes. For example, bonds are typically issued in amounts of $1,000 per bond and trade in multiples of $100,000 or 100 bonds. If a seller has 231 bonds (worth $231,000), utilizing rules similar to that for bank loans whereby the buyers are subject to having their bids filled in odd amounts, the seller may sell its bonds to a buyer who placed a bid for 200 bonds plus or minus 50 bonds. Therefore, the rounding mechanism could increase the liquidity for odd-size trades of bonds. Further, an announced auction may increase interest in any particular sale or reverse-offer purchase of bonds.

Similarly, the present invention may be applied to the trading of large blocks of stocks where the utilization of existing bid and offer systems on exchanges may cause large order imbalances that significantly and adversely impact the sale price. Exchanges will typically display bids and offers for stock up to amounts of $1,000,000 for example. If an order were placed for $5,000,000 or more, the sheer size of this order may move the market price against the party placing the order. Block trades are therefore typically conducted through block trading desks of broker-dealers. Similar to trading bonds over the counter, utilizing these block trading desks may result in expensive execution as the large amount of the trade may require an extensive effort and large risk to resell the large position. Therefore, like the trading of bonds, utilizing the disclosed system and either the auction method or the rounding and matching method in accordance with the present invention may be more efficient and less expensive than the current method of trading though dealers' block trading desks.

Another possible application of the present invention is to the trading of odd lots of stocks. Stock trades are usually executed in amounts of 100 shares of stock. The present invention could apply the rounding and matching method previously discussed to post even amounts of the number of shares that may lead to the filling of odd-size number of share trades The linked order aspect of the present invention could be used to allow sellers to post very specific alternative fill instructions for stocks and bonds. E.g., a seller may wish to sell only either $1,000,000 of bonds or $750,000 of bonds. This could be accomplished with a linked order of $1,000,000 All or None and $750,000 All or None.

The system's auction function could also be applied to other financial assets. In other markets where the financial assets may be somewhat illiquid, therefore there may not be a competitive bid for all specific assets for sale, sellers may wish to sell the specific asset by way of auction. This applies especially to large financial assets sales where the dutch auction method described herein would allow a large sale to be divided into small portions allowing for better execution of the sale.

In addition to the auctioning of financial assets, the present invention can be applied to the auctioning of non-financial assets. For both financial and non-financial assets, the present invention solves two issues at once. First, auctions with displayed prices and fixed end times create a rush to bid near the end time. By having a fixed end time, higher bids that may have been submitted given more time (or an open end until the "gavel falls") would be prevented. Second, on-line auctions create an environment allowing for more participants, especially as most participants are not in the business of traveling to participate in small or one-off auctions. If a displayed-price auction is desired, then an on-line, open-ended auction would reach the most participants and generate the best bid because of (1) not preventing a higher bid (as discussed above), and (2) encouraging more participants such that more participants generates more bids, which generally will generate a higher highest bid in the long run.

While the present invention has been particularly shown and described in conjunction with preferred embodiments thereof, it will be readily appreciated by those of ordinary skill in the art that various changes may be made without departing from the spirit and scope of the invention. For example, although the present invention has been described with respect to the trading and auctioning of bank loans, the present invention is not limited solely thereto and may be widely applied to the trading and auctioning of other financial interests within the secondary market, such as real estate and project finance loans As another example, although the present invention has been described as being a functional website on the Internet, the present invention suitably may be applied to intranets or even the non-computer forum.

Therefore, it is intended that appended claims be interpreted as including the embodiments described herein, the alternatives mentioned above and all equivalents thereto.

What is claimed is:

1. A bank loan trading method for matching buyers with sellers of bank loans, comprising the steps of:
   using a computer or other system to post to buyers and sellers bank loan information regarding bank loans for sale;
   entering by one or more of said sellers offers for respective ones of the posted bank loans
   entering by one or more of said buyers bids or respective ones of the posted bank loans;
   posting to said buyers and sellers the bids and offers for each of the posted bank loans;
   determining whether a match exists between one of said bids and one of said offers for the same bank loan;
   filling the matching bid and offer by conducting a trade between the buyer entering said one of said bids and the seller entering said one of said offers; and
   further comprising the steps of a buyer or a seller or both designating whether a partial order may be filled, for both bids and offers, are carried out by designating an All or None order, a Partial Fill order, or Partial Increments Only order; said All or None order representing an order having a possible fill amount of only said bank loan dollar amount, said Partial Fill order representing an order having possible fill amounts of increments of a predetermined size greater than the unit of currency of said loan between and including a minimum size and said bank loan dollar amount, and said Partial Increments Only order representing an order having possible fill amounts of said minimum size, incremental amounts greater than said minimum size and less than said bank loan dollar amount in increments of an increment size greater than the unit of currency of said loan, and said bank loan dollar amount, said minimum size and said increment amount being designated by a seller entering said offer or a buyer entering said bid.

2. A bank loan trading method for matching buyers with sellers of bank loans, comprising the steps of:
   using a computer or other system to post to buyers and sellers bank loan information regarding bank loans for sale;
   entering by one or more of said sellers offers for respective ones of the posted bank loans;
   confirming that filling any possible fill amounts of an entered order would not result in a violation of terms of the respective bank loan being offered;
   entering by one or more of said buyers bids for respective ones of the posted bank loans;
   posting to said buyers and sellers the bids and offers for each of the posted bank loans;
   determining whether a match exists between one of said bids and one of said offers for the same bank loan; and
   filling the matching bid and offer by conducting a trade between the buyer entering said one of said bids and the seller entering said one of said offers;
   wherein the entered offers represent actual offers, and the step of posting the offers for each of the posted bank loans is carried out by rounding each of said actual offers to a nearest interval of a preset dollar amount to provide rounded offers and posting only the founded offers and said step of posting the bids and offers further includes the steps of determining whether each of said rounded offers is within a predetermined offset amount of the respective actual offer and posting information for each of the posted rounded offers indicating whether the respective rounded offer is within the predetermined offset amount of the actual offer.

3. The bank loan trading method of claim 2, wherein said preset dollar amount is $1,000,000, and said predetermined offset amount is $100,000.

4. The bank loan trading method of claim 2, wherein an offer of a subject loan has been posted and further comprising a step of entering by one of said buyers an order exact amount or less or an exact amount or more of said subject loan.

5. A bank loan trading method for matching buyers with sellers of bank loans, comprising the steps of:
   using a computer or other system to post to buyers and sellers bank loan information regarding bank loans for sale;
   entering by one or more of said sellers offers for respective ones of the posted bank loans;
   confirming that filling any possible fill amounts of an entered order would not result in a violation of terms of the respective bank loan being offered;
   entering by one or more of said buyers bids for respective ones of the posted bank loans;
   posting to said buyers and sellers the bids and offers for each of the posted bank loans;
   determining whether a match exists between one of said bids and one of said offers for the same bank loan;
   filling the matching bid and offer by conducting a trade between the buyer entering said one of said bids and the seller entering said one of said offers;
   wherein the entered offers represent actual offers, and the step of posting the offers for each of the posted bank loans is carried out by rounding each of said actual offers to a nearest interval of a preset dollar amount to provide rounded offers and posting only the rounded offers and the step of entering bids is carried out by entering only bids in intervals of said preset dollar amount; and the step of determining whether a match exists is carried out by determining whether a match exists between a bid and the rounded offer for the same bank loan; and the step of entering bids or offers further includes the steps of indicating, for each bid or offer, whether a partial order may be filled and entering partial amounts representing portions of said actual bid or actual offer that are acceptable to fill the bid or the offer, with such preset dollar amount being greater than the unit of currency of said loan.

6. A bank loan trading method for matching buyers, with sellers of bank loans, comprising the steps of:
   using a computer or other system to post to buyers and sellers bank loan information regarding bank loans for sale;
   entering by one or more of said sellers offers for respective ones of the posted bank loans;
   confirming that filling any possible fill amounts of an entered order would not result in a violation of terms of the respective bank loan being offered;
   entering by one or more of said buyers bids for respective ones of the posted bank loans;
   posting to said buyers and sellers the bids and offers for each of the posted bank loans;

determining whether a match exists between one of said bids and one of said offers for the same bank loan; and filling the matching bid and offer by conducting a trade between the buyer entering said one of said bids and the seller entering said one of said offers;

wherein each of said posted bank loans includes a respective minimum retained amount restriction that is greater than zero and the step of filling the matching bid and offer is carried out by conducting a trade representing an entire amount or a partial amount of the respective bank loan; said bank loan trading process further comprising the steps of determining, when a partial amount of the respective bank loan can be traded, whether an amount of the loan to be retained by the respective seller if the respective; loan is partially traded is greater than or equal to the minimum retained amount restriction of the respective loan; and preventing the respective seller from entering the respective offer if the respective offer can result in an amount retained by the respective seller that is not greater than or equal to the minimum retained amount restriction of the respective loan.

7. A bank loan trading method for matching buyers with sellers of bank loans comprising the steps of:

using a computer or other system to post to buyers and sellers bank loan information regarding bank loans for sale;

entering by one or more of said sellers offers for respective ones of the posted bank loans;

entering by one or more of said buyers bids for respective ones of the posted bank loans;

posting to said buyers and sellers the bids and offers for each of the posted bank loans;

determining whether a match exists between one of said bids and one of said offers for the same bank loan;

filling the matching bid and offer by conducting a trade between the buyer entering said one of said bids and the seller entering said one of said offers;

wherein the step of entering bids further include the step of entering whether the respective bid is disclosed or undisclosed; and the step of posting bids and offers posts only the disclosed bids and offers; said bank loan trading method further comprising the step of determining whether a match exists between one of said bids and one of said offers for the same bank loan further includes the step of determining, if no match exists for a respective offer and said offer is undisclosed, whether one of said bids for the same bank loan as the undisclosed offer is within a predetermined amount of the undisclosed offer and advising both the respective seller that entered the undisclosed offer and the respective buyer that entered said one of said bids of a proximity of the undisclosed offer and said one of said bids.

8. A system for facilitating trading of bank loans between buyers and sellers comprising:

a storage device;

a processor connected to the storage device, the storage device storing a program for controlling the processor;

the processor operative with the program to:

post to buyers and sellers bank loan information regarding bank loans sale;

receive from one or more of said sellers offers for respective ones of the posted bank loans;

receive by one or more of said buyers bids for respective ones of the posted bank loans;

post to said buyers and sellers the bids and offers for each of the posted bank loans;

determine whether a match exists between one of said bids and one of said offers for the same bank loan;

wherein the received indication whether a partial order may be filled, for both bids and offers, designates an All or None order, a Partial Fill order, or a Partial Increments Only order as chosen by a buyer or a seller or both; said All or None order representing an order having a possible fill amount of only said bank loan dollar amount, said Partial Fill order representing an order having possible fill amounts of increments of a predetermined size greater than the unit of currency of said loan between and including a minimum size and said bank loan dollar amount, and said Partial Increments Only order representing an order having possible fill amounts of said minimum size, incremental amounts greater than said minimum size and less than said bank loan dollar amount in increments of an increment size, greater than the unit of currency of said loan, and said bank loan dollar amount; said processor further receiving said minimum size and said increment amount from a seller supplying an offer or from a buyer supplying a bid.

9. A system, for facilitating trading of bank loans between buyers and sellers comprising:

a storage device;

a processor connected to the storage device the storage device storing a program for controlling the processor;

the processor operative with the program to:

post to buyers and sellers bank loan information regarding bank loans for sale receive from one or more of said sellers offers for respective ones of the posted bank loans;

confirm that filling any possible fill amounts of an entered order would not result in a violation of terms of the respective bank loan being offered;

receive by one or more of said buyers bids for respective ones of the posted bank loans;

post to said buyers and sellers the bids and offers for each of the posted bank loans;

determine whether a match exists between one of said bids and one of said offers for the same bank loan; and notify the buyer entering said one of said bids and the seller entering said one of said offers that their respective bid and offer has been filled;

wherein the entered offers represent actual offers, and the processor operates to round each of said actual offers to a nearest interval of a preset dollar amount to provide rounded offers and to post only the rounded offers and said processor operates to determine whether each of said rounded offers is within a predetermined offset amount of the respective actual offer and to post to said buyers and sellers information for each of the posted rounded offers indicating whether the respective rounded offer is within the predetermined offset amount of the actual offer.

10. The system of claim 9, wherein said preset dollar amount is $1,000,000, and said predetermined offset amount is $100,000.

11. The system of claim 9, wherein an offer of a subject loan has been posted and said processor receives a bid from one of said buyers in an exact amount or less or an exact amount or more of said subject loan.

12. A system for facilitating trading of bank loans between buyers ad sellers, comprising:

a storage device;

a processor connected to the storage device, the storage device storing a program for controlling the processor;

the processor operative with the program to:

post to buyers and sellers bank loan information regarding bank loans for sale receive from one or more of said sellers offers for respective ones of the posted bank loans;

confirm that filling any possible fill amounts of an entered order would not result in a violation of terms of the respective bank loan being offered;

receive by one or more of said buyers bids for respective ones of the posted bank loans;

post to said buyers and seller the bids and offers for each of the posted bank loans;

determine whether a match exists between one of said bids and one of said offers for the same bank loan; and notify the buyer entering said one of said bids and the seller entering said one of said offers that their respective bid and offer has been filled;

wherein the entered offers represent actual offers, and the processor operates to round each of said Actual offers to a nearest interval of a preset dollar amount to provide rounded offers and to post only the rounded offers, said processor operates to receive only bids in intervals of said preset dollar amount; and to determine whether a match exists between a bid and the rounded offer for the same bank loan; and said processor operates to receive an indication from sellers, for each bid or offer, whether a partial order may be filled to receive from the sellers partial amounts representing portions of said actual bid or offer that are acceptable to fill the bid or offer, with such preset dollar amount being greater than the unit of currency of said loan.

13. A system for facilitating trading of bank loans between buyers and sellers comprising:

a storage device;

a processor connected to the storage device; the storage, device storing a program for controlling the processor;

the processor operative with the program to:

post to buyers and sellers bank, loan information regarding bank loans for sale receive from one or more of said sellers offers for respective ones of the posted bank loans;

confirm that filling any possible fill amounts of an entered order would not result in a violation of terms of the respective bank loan being offered;

receive by one or more of said buyers bids for respective ones of the posted bank loans;

post to said buyers and sellers the bids and offers for each of the posted bank loans;

determine whether a match exists between one of said bids and one of said offers for the same bank loan; and notify the buyer entering said one of said bids and the seller entering said one of said offers that their respective bid and offer has been filled;

wherein each of said posted bank loans includes a respective minimum retained amount restriction that is greater than zero and the processor operates to determine, when a partial amount of the respective bank loan can be traded, whether an amount of the loan to be retained by the respective seller if the respective loan is partially traded is greater than or equal to the minimum retained amount restriction of the respective loan; and to cancel the respective offer if the respective offer can result in an amount retained by the respective seller that is not greater than or equal to the minimum retained amount restriction of the respective loan.

14. A bank loan trading method for matching buyers with sellers of ban loans, comprising the steps of:

A system for facilitating trading of ban loans between buyers and sellers, comprising:

a storage device;

a processor connected to the storage device, the storage device storing a program for controlling the processor;

the processor operative with the program to:

post to buyers and sellers bank loan information regarding bank loan for sale;

receive from one or more of said sellers offers for respective ones of the posted bank loans;

receive by one or more of said buyers bids for respective ones of the posted bank loans;

post to said buyers and sellers the bids and offers for each of the posted bank loans;

determine whether a match exists between one of said bids and one of said offers for the same bank loan; and wherein said processor operates to receive from buyers indications, for each bid, whether the respective bid is disclosed or undisclosed; and to post to buyers and sellers only the disclosed bids and offers and said processor further operates to determine, if no match exists for a respective offer and said offer is undisclosed, whether one of said bids for the same bank loan as the undisclosed offer is within a predetermined amount of the undisclosed offer and to inform both the respective seller that entered the undisclosed offer and the respective buyer that entered said one of said bids of a proximity of the undisclosed offer and said one of said bids.

* * * * *